(12) United States Patent
Asplund et al.

(10) Patent No.: US 12,261,719 B2
(45) Date of Patent: Mar. 25, 2025

(54) METHOD AND DEVICE(S) FOR SUPPORTING CALIBRATION OF A MULTI-ANTENNA ARRAY COMPRISED IN AN ANTENNA DEVICE OPERATIVE WITH A WIRELESS COMMUNICATION NETWORK

(71) Applicant: Telefonaktiebolaget LM Ericsson (publ), Stockholm (SE)

(72) Inventors: Henrik Asplund, Stockholm (SE); Martin Johansson, Mölndal (SE); David Astely, Bromma (SE); Karl Werner, Segeltorp (SE); Benny Lennartson, Hägersten (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 121 days.

(21) Appl. No.: 18/014,347

(22) PCT Filed: Jul. 7, 2020

(86) PCT No.: PCT/SE2020/050712
§ 371 (c)(1),
(2) Date: Jan. 4, 2023

(87) PCT Pub. No.: WO2022/010389
PCT Pub. Date: Jan. 13, 2022

(65) Prior Publication Data
US 2023/0308312 A1  Sep. 28, 2023

(51) Int. Cl.
*H04K 1/10* (2006.01)
*H04B 17/12* (2015.01)
(Continued)

(52) U.S. Cl.
CPC ........... *H04L 25/021* (2013.01); *H04B 17/12* (2015.01); *H04B 17/21* (2015.01); *H04B 17/24* (2015.01); *H04L 25/0224* (2013.01)

(58) Field of Classification Search
CPC ... H04L 25/021; H04L 25/0224; H04B 17/12; H04B 17/21; H04B 17/24; H04B 7/0691; H02J 50/42; H04W 4/20
(Continued)

(56) References Cited

U.S. PATENT DOCUMENTS

| 5,459,668 A | 10/1995 | Dogan et al. |
| 6,232,918 B1 * | 5/2001 | Wax ........................ H04W 4/20 342/174 |

(Continued)

FOREIGN PATENT DOCUMENTS

| CN | 102544755 A | 7/2012 |
| CN | 102544755 B | 12/2013 |

(Continued)

OTHER PUBLICATIONS

Dogan, et al., "Applications of Cumulants to Array Processing—Part I: Aperture Extension and Array Calibration," IEEE Transactions on Signal Processing, vol. 43, Issue 5, May 1995, pp. 1200-1216.

(Continued)

*Primary Examiner* — Phuong Phu
(74) *Attorney, Agent, or Firm* — Withrow & Terranova, PLLC

(57) ABSTRACT

Method and one or more first devices for supporting calibration of a multi-antenna array comprised in a first antenna device operative with a wireless communication network. The first device(s) provide phase correcting information, to be used in calibration of the multi-antenna array, based on covariances corresponding to recurrent displacement vectors of the multi-antenna array. Said covariances being based on channel estimates estimated from certain radio signals received after transmission over radio propagation channels between said multi-antenna array of the first antenna device (Continued)

and one or more second antenna devices operative with the wireless communication network.

19 Claims, 9 Drawing Sheets

(51) Int. Cl.
  *H04B 17/21* (2015.01)
  *H04B 17/24* (2015.01)
  *H04L 25/02* (2006.01)
  *H04L 27/28* (2006.01)

(58) Field of Classification Search
  USPC .................................. 375/260, 285, 346, 296
  See application file for complete search history.

(56) References Cited

U.S. PATENT DOCUMENTS

| | | |
|---|---|---|
| 6,983,127 B1 | 1/2006 | Da Torre et al. |
| 8,379,745 B1 | 2/2013 | Nabar et al. |
| 10,985,787 B1 | 4/2021 | Bloechl et al. |
| 2013/0242761 A1 | 9/2013 | Park |
| 2015/0304130 A1 | 10/2015 | Logothetis et al. |
| 2018/0048374 A1* | 2/2018 | Johansson ............ H04B 7/0691 |
| 2020/0011956 A1 | 1/2020 | Zarubica et al. |
| 2020/0204002 A1* | 6/2020 | Hajimiri ............... H02J 50/402 |

FOREIGN PATENT DOCUMENTS

| | | |
|---|---|---|
| WO | 2016169577 A1 | 10/2016 |
| WO | 2023018362 A1 | 2/2023 |

OTHER PUBLICATIONS

Extended European Search Report for European Patent Application No. 20944677.2, mailed Mar. 6, 2024, 8 pages.

Swindlehurst, et al., "Multiple invariance ESPRIT," IEEE Transactions on Signal Processing, vol. 40, Issue 4, Apr. 1992, 15 pages.

Vieira, et al., "A Receive/Transmit Calibration Technique based on Mutual Coupling for Massive MIMO Base Stations," International Symposium on Personal, Indoor, and Mobile Radio Communications, 2016, Valencia, Spain, 6 pages.

International Search Report and Written Opinion for International Patent Application No. PCT/SE2020/050712, mailed Apr. 28, 2021, 11 pages.

Becirovic, et al., "Joint Antenna Detection and Bayesian Channel Estimation for Non-Coherent User Terminals," IEEE Transactions on Wireless Communications, vol. 19, Issue 11, Nov. 2020, pp. 7081-7096.

Glamocic, et al., "Calibration of mmWave Antenna Arrays for Initial Access in Massive MIMO 5G Cellular Networks," 20th International Workshop on Signal Processing Advances in Wireless Communications, 2019, 5 pages.

International Search Report and Written Opinion for International Patent Application No. PCT/SE2021/050784, mailed Apr. 8, 2022, 11 pages.

* cited by examiner

METHOD AND DEVICE(S) FOR SUPPORTING CALIBRATION OF A MULTI-ANTENNA ARRAY COMPRISED IN AN ANTENNA DEVICE OPERATIVE WITH A WIRELESS COMMUNICATION NETWORK

This application is a 35 U.S.C. § 371 national phase filing of International Application No. PCT/SE2020/050712, filed Jul. 7, 2020, the disclosure of which is incorporated herein by reference in its entirety.

TECHNICAL FIELD

Embodiments herein concern a method and devices(s) for supporting calibration of a multi-antenna array comprised in a first antenna device operative with a wireless communication network, such as a telecommunications network.

BACKGROUND

Communication devices such as wireless communication devices, that simply may be named wireless devices, may also be known as e.g. user equipments (UEs), mobile terminals, wireless terminals and/or mobile stations. A wireless device is enabled to communicate wirelessly in a wireless communication network, wireless communication system, or radio communication system, e.g. a telecommunication network, sometimes also referred to as a cellular radio system, cellular network or cellular communication system. The communication may be performed e.g. between two wireless devices, between a wireless device and a regular telephone and/or between a wireless device and a server via a Radio Access Network (RAN) and possibly one or more core networks, comprised within the cellular communication network. The wireless device may further be referred to as a mobile telephone, cellular telephone, laptop, Personal Digital Assistant (PDA), tablet computer, just to mention some further examples. Wireless devices may be so called Machine to Machine (M2M) devices or Machine Type of Communication (MTC) devices, i.e. devices that are not associated with a conventional user.

The wireless device may be, for example, portable, pocket-storable, hand-held, computer-comprised, or vehicle-mounted mobile device, enabled to communicate voice and/or data, via the RAN, with another entity, such as another wireless device or a server.

The wireless communication network may cover a geographical area which is divided into cell areas, wherein each cell area is served by at least one base station, or Base Station (BS), e.g. a Radio Base Station (RBS), which sometimes may be referred to as e.g. "eNB", "eNodeB", "NodeB", "B node", "gNB", or BTS (Base Transceiver Station), depending on the technology and terminology used. The base stations may be of different classes such as e.g. macro eNodeB, home eNodeB or pico base station, based on transmission power and thereby also cell size. A cell is typically identified by one or more cell identities. The base station at a base station site may provide radio coverage for one or more cells. A cell is thus typically associated with a geographical area where radio coverage for that cell is provided by the base station at the base station site. Cells may overlap so that several cells cover the same geographical area. By the base station providing or serving a cell is typically meant that the base station provides radio coverage such that one or more wireless devices located in the geographical area where the radio coverage is provided may be served by the base station in said cell. When a wireless device is said to be served in or by a cell this implies that the wireless device is served by the base station providing radio coverage for the cell. One base station may serve one or several cells. Further, each base station may support one or several communication technologies. The base stations communicate over the air interface operating on radio frequencies with the wireless device within range of the base stations.

In some RANs, several base stations may be connected, e.g. by landlines or microwave, to a radio network controller, e.g. a Radio Network Controller (RNC) in Universal Mobile Telecommunication System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communication (originally: Groupe Spécial Mobile), which may be referred to as 2nd generation or 2G.

UMTS is a third generation mobile communication system, which may be referred to as 3rd generation or 3G, and which evolved from the GSM, and provides improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Such networks may be named WCDMA/HSPA.

The expression downlink (DL) may be used for the transmission path from the base station to the wireless device. The expression uplink (UL) may be used for the transmission path in the opposite direction i.e. from the wireless device to the base station.

In 3rd Generation Partnership Project (3GPP) Long Term Evolution (LTE), base stations, which may be referred to as eNodeBs or eNBs, may be directly connected to other base stations and may be directly connected to one or more core networks. LTE may be referred to as 4th generation or 4G.

The 3GPP has undertaken to evolve further the UTRAN and GSM based radio access network technologies, for example into evolved UTRAN (E-UTRAN) used in LTE.

Work is ongoing with developing a next generation wide area networks, which may be referred to as Next generation (NX), New Radio (NR), or fifth generation (5G).

Advanced Antenna Systems (AAS) is an area where technology has advanced significantly in recent years and where it is also foreseen a rapid technology development also in the years to come. AAS, massive Multiple Input Multiple Output (MIMO) transmission and reception, and beamforming, are important for 5G and NR systems. Also, higher frequencies than for earlier generations are planned to e used. Multiple antenna elements are used to form beams, typically with higher antenna gain than at lower frequencies to compensate for the challenging propagation properties at higher frequencies. A beam is considered narrower than another beam if its radiation is focused in a smaller, possibly discontinuous, total angular range than the other beam. NR is sometimes called a beam-based system. As realized from this, although antennas have always been important for wireless communication systems, this may be even more true for NR.

Multi-antenna arrays will be employed for NR and 5G and are increasingly used in wireless communication systems, not only for NR. Multi-antenna transmission or reception can be utilized to increase signal power, provide diversity against fading, and/or provide spatial multiplexing of resources using e.g. MIMO transmission schemes. In the transmitting mode, these gains can be realized by simultaneously transmitting signals with different amplitude and phase relations over different elements in the array, where these amplitude and phase relations are determined by various multi-antenna signal processing methods.

Many multi-antenna communication methods rely on phase (and amplitude) coherency between the antennas in the array to be able to form transmission beams in desired directions. A number of methods have been devised to achieve such coherency:

One method is to use careful RF design demanding very strict tolerance limits, however this is very costly and can limit the practical use of the array (e.g. if all feeder cables need to be of the same electrical lengths down to a fraction of the wavelength).

Another method is to add a calibration network and functionality that allows tapping of a signal with a known nominal phase relation between the antennas and measuring the actual phase relation. The difference can then be compensated e.g. at baseband or RF. This method adds additional hardware and is therefore also complex and costly. Also, this method may not be able to calibrate errors which occur between the tapping point and the antenna elements.

Yet another method is to measure the array response under controlled conditions, e.g. in an anechoic chamber of in free space conditions with a known direction to the transmitter or receiver. Again a very costly approach, in particular if many arrays need to be characterized due to manufacturing variances.

SUMMARY

In view of the above, an object is to provide one or more improvements or alternatives in relation to the prior art, in particular to provide improvements regarding calibration of a multi-antenna array, such as for use in transmission and/or reception of radio signals in wireless communication network, e.g. based on LTE or NR.

According to a first aspect of embodiments herein, the object is achieved by a method, performed by one or more first devices, for supporting calibration of a multi-antenna array comprised in a first antenna device operative with a wireless communication network. The first device(s) provides phase correcting information, to be used in calibration of the multi-antenna array, based on a subset of covariances corresponding to recurrent displacement vectors of the multi-antenna array. Said covariances being based on channel estimates estimated from certain radio signals received after transmission over radio propagation channels between said multi-antenna array of the first antenna device and one or more second antenna devices operative with the wireless communication network.

According to a second aspect of embodiments herein, the object is achieved by one or more first devices for supporting calibration of a multi-antenna array comprised in a first antenna device configured to be operative with a wireless communication network. Said one or more first devices are configured to provide phase correcting information, to be used in calibration of the multi-antenna array, based on a subset of covariances corresponding to recurrent displacement vectors of the multi-antenna array. Said covariances being based on channel estimates estimated from certain radio signals received after transmission over radio propagation channels between said multi-antenna array of the first antenna device and one or more second antenna devices configured to be operative with the wireless communication network.

Embodiments herein are based on realization of some mathematical and technical relations, and how the recurrent displacement vectors with corresponding reduced amount of covariances, e.g. corresponding to covariance matrix entries, based on channel estimates can be utilized to find out about the phase errors and thereby information for correction of the phase errors, i.e. the phase correcting information, that thus can be used for calibration regarding the phase errors. Advantages compared to prior art solutions include for example that embodiments herein enable less complex and less costly calibration methods. Conventional calibration methods, e.g. regarding residual errors, may still be applied but to fewer phases, which may facilitate implementation and reduce costs as well. Embodiments herein may further be implemented using standardized codebooks, e.g. Grid of Beams (GoB) based codebooks as in LTE and NR, providing performance benefits. Also, embodiments herein may utilize reference signals that are typically already present in a wireless communication network, reducing overhead and facilitating implementation in and compatibility with existing wireless communication networks. In other words, to sum up, embodiments herein provide improvements regarding calibration of a multi-antenna array, such as for use in transmission and/or reception of radio signals in a wireless communication network.

BRIEF DESCRIPTION OF THE DRAWINGS

Examples of embodiments herein are described in more detail with reference to the appended schematic drawings, which are briefly described in the following.

DETAILED DESCRIPTION

Figure 1:
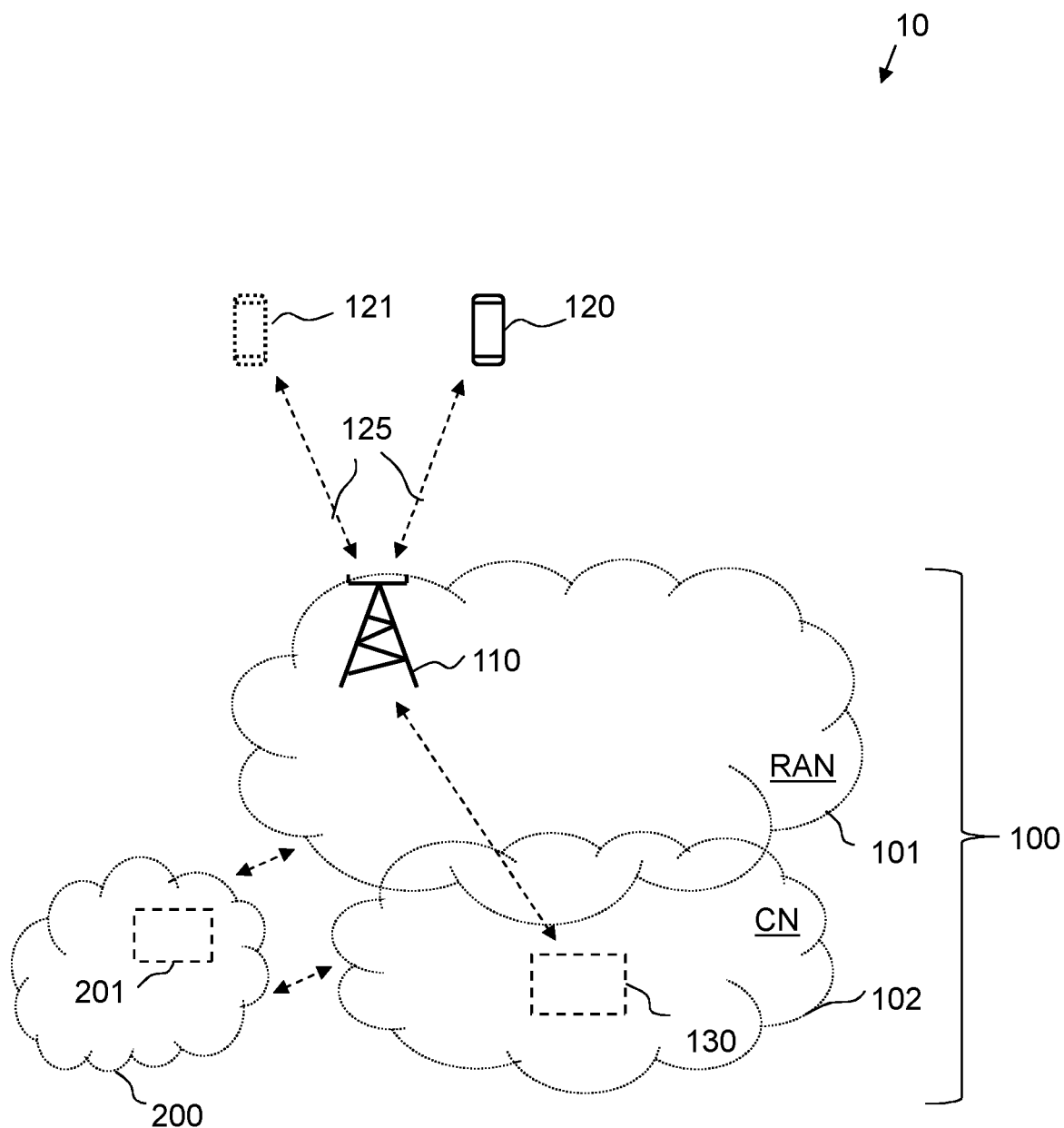
FIG. 1 is a block diagram schematically depicting an example of a wireless communication network in relation to which embodiment herein may be implemented.

Throughout the following description similar reference numerals may be used to denote similar elements, units, modules, circuits, nodes, parts, items or features, when applicable. Features that appear only in some embodiments are, when embodiments are illustrated in a figure, typically indicated by dashed lines.

Embodiments herein are illustrated by exemplary embodiments. It should be noted that these embodiments are not necessarily mutually exclusive. Components from one embodiment may be tacitly assumed to be present in another embodiment and it will be obvious to a person skilled in the art how those components may be used in the other exemplary embodiments.

Embodiments herein may from some perspective be described as based on utilization of a priori information on the antenna array configuration to determine what structure a covariance, i.e. correlation, matrix of the radio channel should have if the antenna array would have been perfectly calibrated, e.g. that some elements should have identical phase shifts. Practical measurements of the covariance matrix may be obtained during normal operation of the wireless communication network and are then used, by finding the phase shifts, or phase errors, between these elements and finding a "calibration vector" that compensates for this. The calibration vector may then be applied to the inputs to the antenna array, and/or outputs from the antenna array, in order to create a calibrated array response.

In other words, the geometry of the antenna array is used in combination with second order channel statistics, herein corresponding to a channel covariance matrix, estimated from transmissions with or receptions by the antenna array to determine the phase errors in the array. The array may then be calibrated by applying the inverse of these estimated phase errors to signals transmitted or received by the antenna array.

Embodiments herein are able to calibrate e.g. a uniform linear array up to a single unknown linear phase gradient, and a uniform planar array up to a single unknown linear phase gradient per dimension. If needed, these final phase gradients may be determined with a lower complexity version of traditional calibration methods, or they may be arbitrarily set, without effect on performance in some cases.

There are several advantages associated with embodiments herein. For example:
- There is provided a simpler and cheaper calibration solution than in the prior art—calibration using conventional methods can be simplified to fewer, e.g. just one or a few, phases, or even avoided altogether.
- Embodiments herein can utilize reference signals that are typically already present in a wireless communication network, e.g. already being used but for other purposes, which reduces overhead.
- Not requiring or relying on dedicated hardware for calibration.
- Calibration based on embodiments herein allows for alignment of effective channels with standardized codebooks, e.g. GoB based codebooks as in LTE and NR, and provide performance benefit.
- Calibration based on embodiments herein also enables more efficient processing, e.g. channel estimation, or precoder computation, at the receiver side, since e.g. beamspace transformation requires structure in the channel.

Embodiments herein are below described and exemplified in further detail, starting with some underlying basics and ideas as a development towards the embodiments.

However, first a wireless communication network will be described for providing a context in which embodiments herein may be implemented and utilized.

FIG. 1 is a block diagram schematically depicting a wireless communication network 100 for this purpose.

The wireless communication network 100 may comprise a Radio Access Network (RAN) 101 part and a Core Network (CN) 102 part. The wireless communication network 100 may be a telecommunication network or system, such as a cellular communication network that supports at least one Radio Access Technology (RAT), e.g. LTE, or 4G, and/or New Radio (NR) that also may be referred to as 5G, or even further generations.

The wireless communication network 100 typically comprises network nodes that are communicatively interconnected. The network nodes may be logical and/or physical and are located in one or more physical devices. The wireless communication network 100, typically the RAN 101, comprises one or more radio network nodes, e.g. radio network nodes 110. The radio network nodes are or comprise radio transmitting and/or receiving network nodes, such as base stations and/or are or comprises controlling nodes that control one or more radio transmitting and/or receiving network nodes. The radio network nodes are configured to serve and/or control and/or manage one or more wireless communication devices. Each radio network node provide one or more radio coverages, e.g. corresponding to one or more radio coverage areas, i.e. radio coverage that enables communication with one or more wireless communication devices. A wireless communication device may alternatively be named a wireless device and it may correspond to a UE etc. as mentioned in the Background. Each radio coverage may be provided by and/or associated with a particular Radio Access Technology (RAT). Each radio coverage area may correspond to a so called cell or a radio beam, that simply may be named a beam. As should be recognized by the skilled person, a beam is a more dynamic and relatively narrow and directional radio coverage compared to a conventional cell, and may be accomplished by so called beamforming. A beam is typically for serving one or a few communication devices at the same time, and may be specifically set up for serving one or few communication devices. The beam may be changed dynamically by beamforming to provide desirable coverage for the one or more wireless communication devices being served by the beam. There may be more than one beam provided by one and the same radio network node.

Said radio network nodes may e.g. be communicatively connected, such as configured to communicate, over, or via, a certain communication interface and/or communication link.

Further, the wireless communication network 100, or rather the CN 102, typically comprises one or more core network nodes 130, that may be communicatively connected to each other and other network nodes, such as configured to communicate, over, or via, a communication interface and/or communication link, with radio network nodes of the RAN 101, e.g. with the radio network node 110.

The figure also shows wireless communication devices 120, 121 for communication with the wireless communication network 100, e.g. by being served by the wireless communication network 100, e.g. by the radio network node 110 when within radio coverage associated with it. Radio communication between wireless communication devices and the radio network nodes of the wireless communication network take part over radio channels, e.g. radio propagation channels 125 between each wireless communication device, e.g. 120, and the radio network node 110.

The figure also shows a further node 201 and a further network 200. The further node 201 may be located outside the wireless communication network 100, i.e. be an external node, as indicated in the figure, or alternatively (not indicated in the figure) be comprised in the wireless communication network 100 and thus be a network node thereof, e.g. a management node thereof. The further network node 201 may in principle be any node communicatively connected to the wireless communication network 100. Likewise, the further network 200 may be located outside the wireless communication network 100, i.e. be an external network, as indicated in the figure, e.g. corresponding to a so-called computer cloud, often simply referred to as cloud, that may provide and/or implement services and/or functions for and/or relating to the wireless communication network 100. The further network 200 may alternatively (not indicated in the figure) be comprised in the wireless communication network 100 and thus e.g. correspond to a subnetwork thereof. It is implied that a network 100 and the further network 200 comprises interconnected network nodes and may e.g. include the further node 201 as indicated in the figure. The further network 200 may in principle be any network communicatively connected to the wireless communication network.

Attention is drawn to that FIG. 1 is only schematic and for exemplifying purpose and that not everything shown in the figure may be required for all embodiments herein, as should be evident to the skilled person. Also, a wireless communication network or networks that correspond(s) to the wireless communication network 100, will typically comprise several further network nodes, such as further radio network nodes, e.g. base stations, network nodes, e.g. both radio and core network nodes, etc., as realized by the skilled person, but which are not shown herein for the sake of simplifying.

Embodiments herein may be most readily described in terms of linear or planar uniform (multi) antenna arrays although the concept, as should be realized by the skilled person, may be applied to any general array configuration with multiple antenna elements resulting in recurrent displacement vectors of the array.

Figure 2:
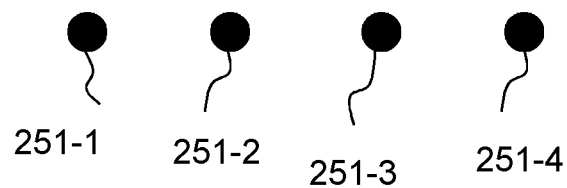
FIG. 2 shows an schematic example of a uniform linear antenna array.

FIG. 2 shows an schematic example of a uniform linear antenna array 250 comprising 1×4, i.e. four, antennas 251-1 . . . 251-4, or in other words an array with 1×4 elements corresponding to the antennas.

Figure 3:
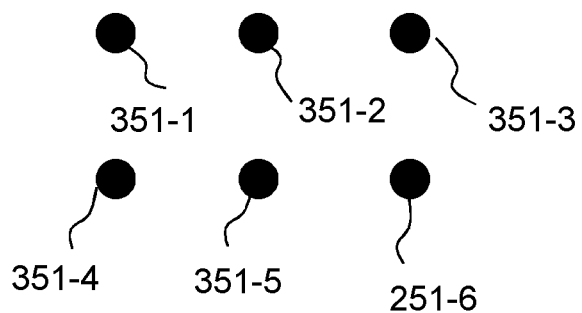
FIG. 3 shows an schematic example of a uniform planar antenna array.

FIG. 3 shows an schematic example of a uniform planar antenna array 350 comprising 2×3, i.e. six, antennas 351-1 . . . 351-6, or in other words an array with 2×3 elements corresponding to the antennas.

When such antenna arrays are used for wireless communication, the propagation channel between each of the antennas and the antenna(s) at the other end of the wireless link is of crucial importance. For example, if the antenna array is comprised in the radio network node 110, the propagation channels are between the antennas of the array, over the radio channel 125, and one or more antennas of the wireless communication device 120. Of course, the similar apply also in the other direction.

The total of the propagation channels, typically referred to as propagation channel in singular, e.g. corresponding to the radio propagation channel 125, is commonly denoted with a vector h, that is possibly time and/or frequency dependent, where each element in h corresponds to the channel between one specific antenna in the array and the receiving antenna. Note that in case of multi-antenna elements also at the other end, there is one h for each antenna, and these may then be arranged in matrix form. However, for explanation of embodiments and to simplify understanding, examples herein are based on the case with a single-antenna at the other end, but this is thus not limiting embodiments herein to only such case. In any case, many multi-antenna communication methods rely on utilizing the spatial characteristics of h, i.e. the correlation or lack thereof between different elements in h. Examples of such methods are diversity, beamforming and spatial multiplexing.

Due to the time and/or frequency variation the second order statistics of h, or covariances, are often preferable to use in various multi-antenna signal processing methods. The covariances arranged in a covariance matrix R is one example of a second order statistics measure and it can be defined as:

$$R = E\{hh^H\},$$

where E {} denotes the expectation and $h^H$ denotes the complex transpose of h. R will be a matrix with elements $R_{mn}$, where m and n are antenna indices in the range 1 . . . . N where N is the number of antennas.

It is known that if the antennas have substantially identical radiation patterns and the array is located in the far field of the sources or scatters in the radio channel, then the covariance or correlation $R_{mn}$ between any pair of antennas m and n will only depend on the displacement $d_{mn}=r_m-r_n$ between the positions of the two antennas, e.g. $R_{mn}=f(d_{mn})$ but not on the individual positions $r_m$ and $r_n$ themselves.

Figure 4A:
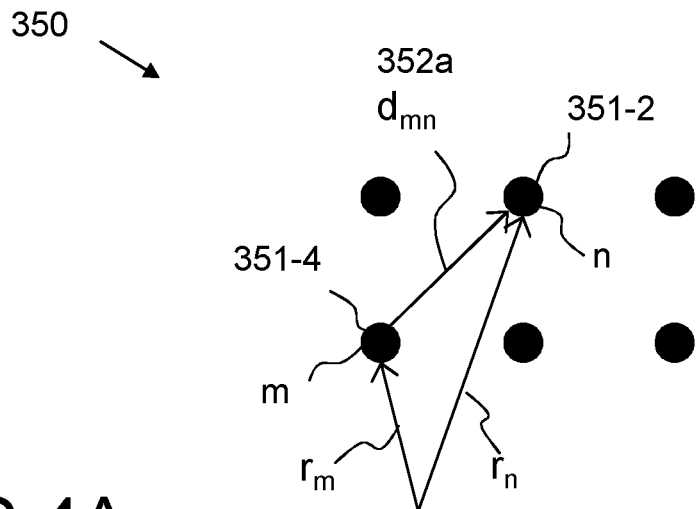
FIG. 4A schematically illustrates element position vectors and displacement vector for a pair of antenna elements.

FIG. 4A schematically illustrates element position vectors $r_m$ and $r_n$ and a displacement vector $d_{mn}$ for a pair of antennas m and n. In the example the general principle and the relations are shown for antennas 351-4 and 351-2, respectively, of the antenna array 350 shown in FIG. 3. The displacement vector $d_{mn}$ in the example corresponds to a displacement vector 352a.

Figure 4B:
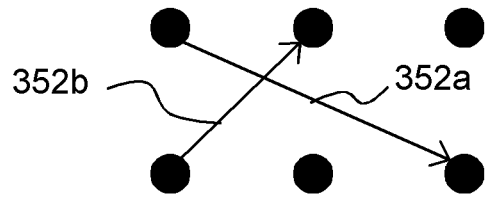
FIG. 4B schematically illustrates an example with two different displacement vectors.

As realized there are a great number of displacement vectors although only one was shown to illustrate the principle in FIG. 4B.

FIG. 4B schematically illustrates an example with two different displacement vectors in the antenna array 350, just to further illustrate the principle. In addition to the exemplifying displacement vector 352a, there is now also shown a further exemplifying displacement vector 352b. Not all antennas, displacement vectors are indicated by reference numerals in the figure for the sake of simplifying and not obscuring the view with too many details. The number of displacement vectors actually equals the number of elements in the covariance matrix and is $N^2$ for an antenna array with N antennas. That is, for the antenna array 350 with 2×3, i.e. . . . six, antennas, there are actually 36 displacement vectors.

Further, since changing the direction of the displacement vector results in a conjugate of the covariance coefficient, the covariance matrix is Hermitian:

$$R_{mn}=f(d_{mn})=f(-d_{mn})^*=f(d_{nm})^*=R_{nm} \qquad \text{Eq.1}$$

When there are e.g. phase errors over the array we can represent these by a diagonal matrix C for which the elements on the diagonal contain the error terms:

$$C_{nn}=e^{i\varphi_n} \qquad \text{Eq. 2}$$

In wireless communications, it is desirable to estimate h to facilitate or enable Efficient communications over the wireless channel. This channel estimation is commonly done by transmitting known, i.e. reference, signals over the wireless channel and comparing the received signals to these reference signals. The estimated channel, i.e. estimate of h, may be named ĥ and can be written as:

$$\hat{h} = Ch + s \qquad \text{Eq. 3}$$

where s corresponds to noise and estimation errors

Calibration may be described as estimating C and then partly or completely compensate for it by multiplying signals to be transmitted or received by $X=C^{-1}$. it may be noted that X and C are diagonal and that $X=C^H$ in case calibration is phase-only.

Embodiments herein utilizes an insight that for antenna arrays with some structure, like Uniform Linear Arrays (ULAs) and Uniform Planar Array (UPAs), such as exemplified in FIGS. 2-3, there will be fewer unique displacement vectors and hence fewer unique coefficients in the covariance matrix than there are elements in the matrix.

Figure 4C:
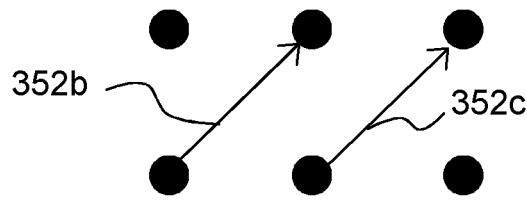
FIG. 4C schematically illustrates another example with two instances of recurring displacement vectors.

FIG. 4C schematically illustrates another example with two instances of recurring displacement vectors in the antenna array 350. In addition to the exemplifying displacement vector 352a, there is shown a displacement vector 352c that corresponds to a recurrence of displacement vector 352a, as realized from the figure.

Figure 4D:
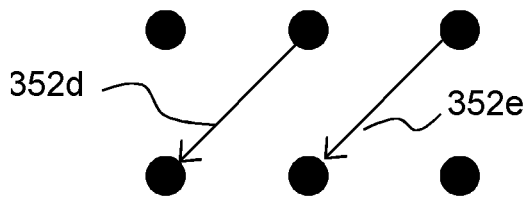
FIG. 4D schematically illustrates yet another example with two different, but recurring, displacement vectors.

FIG. 4D schematically illustrates yet another example with two different, but recurring, displacement vectors in the antenna array 350, displacement vectors 352d, 352e.

Hence, from FIGS. 4C-D it is realized that there is a displacement vector, including its opposite, that occurs four times. This means that four covariance coefficients will be identical.

Embodiments herein may be described as based on utilizing a priori information on the array configuration, e.g. as for the antenna array 350, to identify unique elements in, or more generally the structure of, the covariance matrix, and then use this knowledge to determine C and hence enable calibration of the antenna array, as explained above.

Consider for example a ULA having N antenna elements, e.g. 4 antennas as in the antenna array of FIG. 2. The element positions are in vector r of length N. Let then form a displacement matrix D with:

$$D_{mn} = r_m - r_n \qquad \text{Eq. 4}$$

A ULA has a regular structure of r that can be described as:

$$r = d[0 \ 1 \ \ldots \ N-1]^T \hat{x} \qquad \text{Eq. 5}$$

Hence, for a four-element ULA as the antenna array 250 in FIG. 2 the displacement matrix can be written as:

$$D = d \begin{bmatrix} 0 & -1 & -2 & -3 \\ 1 & 0 & -1 & -2 \\ 2 & 1 & 0 & -1 \\ 3 & 2 & 1 & 0 \end{bmatrix} \hat{x} \qquad \text{Eq. 6}$$

Since the covariance is a function of the displacement, it can be written as:

$$R = \begin{bmatrix} r_0 & r_1^* & r_2^* & r_3^* \\ r_1 & r_0 & r_1^* & r_2^* \\ r_2 & r_1 & r_0 & r_1^* \\ r_3 & r_2 & r_1 & r_0 \end{bmatrix} \qquad \text{Eq. 7}$$

As can be seen, the covariance matrix contains only four unique entries. Now, consider an un-calibrated array on which a sample estimate of the covariance matrix is obtained as:

$$\hat{R} = \frac{1}{M}\sum_{m=1}^{M} \hat{h}\hat{h}^H = \qquad \text{Eq. 8}$$
$$\frac{1}{M}\sum_{m=1}^{M}(Ch+s)(Ch+s)^H = \frac{1}{M}\sum_{m=1}^{M} Chh^H C^H + S = CRC^H + S$$

where M is the number of samples and S contains noise terms.

Since C is diagonal, and if we assume elements on diagonal to be unit magnitude, we have:

$$R = C^H \hat{R} C + S' \qquad \text{Eq. 9}$$

A solution to the problem of calibrating the antenna array, or more generally to be able to provide information to be used for correcting phase errors that the calibration can be based upon, may thus be to find an estimate of X such that $X \hat{R} X^H$ gets the expected structure with only the unique coefficients according to the recurring displacement vectors, i.e. in the example with the antenna array 250 in FIG. 2, with only four unique coefficients.

However, due to the impact of noise and sample estimating (M is finite), the elements of $X\hat{R}X^H$ will have some variability in amplitude and phase. Further, since the magnitude of the correlation coefficient typically reduces with increasing displacement at a rate determined by the angular spread in the channel, the elements corresponding to larger displacements will tend to have lower magnitude and hence typically suffer from more variability.

A robust estimate of C, where X may be computed as the inverse of C, for a ULA array based on the above can be obtained by only considering the first sub-diagonal $\hat{R}$, i.e. only using the largest correlation coefficients corresponding to the shortest displacement vectors, resulting in a first example algorithm that can be used to compute terms of an estimation of C:

$$\hat{C}_{nn} = \exp\left(i\sum_{k=2}^{n} \angle \hat{R}_{k,(k-1)}\right) \quad n > 1 \qquad \text{Eq. 10}$$
$$\hat{C}_{nn} = 1 \qquad n = 1$$
$$\hat{C}_{mn} = 0 \qquad m \neq n$$

where ∠ denotes "the phase of".

Figure 5:
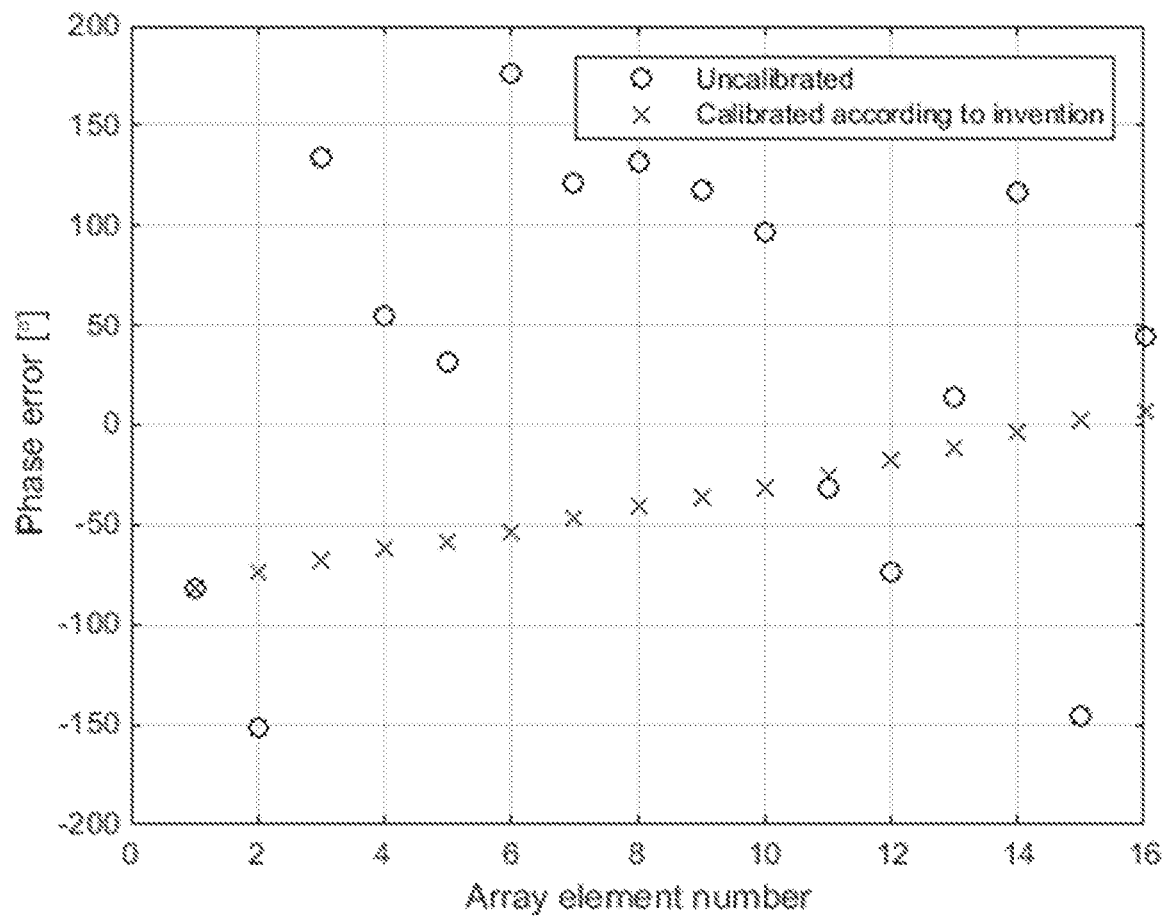
FIG. 5 shows an example result from application of embodiments herein.

FIG. 5 shows an example result from the use of an algorithm based on this equation (Eq. 10), and resulting from application of embodiments herein, where it has been applied to calibrate a 16-element ULA. It is shown the phase error per element in an uncalibrated 16-element ULA (circles) and the phase error after application of the algorithm according to embodiments herein. Here $\hat{R}$ has been estimated using M=100 observations of h, i.e. the channel has been estimated using 100 observations, each with a per-element SNR of 10 dB. The channel coefficients h were in the example obtained from a model of the propagation channel with mean angle of arrival of −14° and an angular spread of about 10°. As can be seen, random phase errors have been reduced. There is a residual absolute phase offset which in almost all applications is of no consequence, and a linear phase error which may result in beam pointing errors. If needed, this linear phase error can be removed using lower complexity versions of the calibration methods known in the art.

The linear phase error may also be implicitly compensated for by using Precoder Matrix Indicator (PMI) feedback from the terminal. For example, in NR systems configured for PMI feedback, the structure of the codebook is such that the linear phase is assumed to be the same for both polarizations of an X-pol array.

As should be realised by the skilled person, many different algorithms for estimating C can be obtained based of the above, i.e. to estimate X such that $X\hat{R}X^H$ gets the expected structure according to the recurrence of displacement vectors and using covariance matrix $\hat{R}$ based on channel estimates. Some further examples of such algorithms will now follow.

In case of a ULA, it is aimed to find $x_n$, n=1 . . . up to the total number of antenna elements, so that, with $d_\Delta$ set arbitrarily:

$$x_n x_{n+1}^H \hat{R}_{n,(n+1)} \approx d_1$$

$$x_n x_{n+\Delta}^H \hat{R}_{n,(n+\Delta)} \approx d_\Delta \qquad \text{Eq. 11}$$

The terms of X can be iteratively solved:

$$x_{n+1}^H = \frac{d_1}{x_n \hat{R}_{n,(n+1)}} \qquad \text{Eq. 12}$$

and normalizing $x_{n+1}^H$ in each step.

It may be noted that also the first example algorithm (Eq. 10) above may be obtained by iteratively solving this equation.

A yet further example algorithm can be based on the following.

Set:

$$a_{n,n+\Delta} = x_n x_{n+\Delta}^H \qquad \text{Eq. 13}$$

Then disregard the dependencies between "a": s and solve Least Square (LS) problems:

$$\min \Sigma_n |a_{n,n+\Delta} r_{n,n+\Delta} - d_\Delta|^2 \qquad \text{Eq. 14}$$

Add a constraint $a_{n,n}=1$.
This results in, e.g. setting $d_\Delta = \hat{R}_{1,(1+\Delta)}$ arbitrarily:

$$\hat{a}_{n,n+\Delta} = \hat{R}_{1,(1+\Delta)} / \hat{R}_{n,(n+\Delta)} \qquad \text{Eq. 15}$$

Then a matrix A can be defined, here exemplified here for a 3 element array, but extension is trivial as should be realized by the skilled person:

$$A = \begin{bmatrix} 1 & a_{1,2} & a_{1,3} \\ a_{2,1} & 1 & a_{2,3} \\ a_{3,1} & a_{3,2} & 1 \end{bmatrix} \qquad \text{Eq. 16}$$

Hence, it can then be computed terms for X by solving the approximation $$\begin{bmatrix} 1 & a_{1,2} & a_{1,3} \\ a_{2,1} & 1 & a_{2,3} \\ a_{3,1} & a_{3,2} & 1 \end{bmatrix} \approx \begin{bmatrix} x_1 \\ x_2 \\ x_3 \end{bmatrix} \begin{bmatrix} x_1 \\ x_2 \\ x_3 \end{bmatrix}^H = xx^H \qquad \text{Eq. 17}$$

This may be done by taking eigenvalue decomposition of A and taking x as the eigenvector corresponding to the largest eigenvalue, and possibly keeping only the phase.

Yet another approach for an example algorithm, applicable for a ULA, may be to minimize over the diagonal elements of C:

$$V(X) = \|X\hat{R}X^H - J\hat{X}RX^H J\|_2^F \qquad \text{Eq. 18,}$$

where J is a matrix with the antidiagonal set to one and all other elements set to 0, and F indicates the Frobenius matrix norm. Note that V(X)=0 if $X\hat{R}X^H$ is Toeplitz.

In case the wireless communication network 100 in NR systems configured for PMI feedback, e.g. in case the wireless communication network 100 correspond to a NR network, the structure of the codebook is such that the linear phase is assumed to be the same for both polarizations of an X-pol array. This structure may readily be enforced in the criterion above by setting de identical for both polarizations. Furthermore, an example algorithm for general structure may be based on minimizing:

$$V(X) = \min_\theta \|X\hat{R}X^H - R(\theta)\|_2^F \qquad \text{Eq. 19,}$$

where R(θ) is a covariance matrix of the structure assumed for the array parameterized by θ. The minimization as such can be done using iterative methods, as realized by the skilled person.

To conclude, in some embodiments, the following actions may be performed, e.g. by the wireless communication network 100, or nodes thereof, e.g. 110, 130, or that are connected thereto, e.g. 200, 201, or 120. The multi-antenna array, e.g. 250 or 350, to be calibrated may e.g. be comprised in the radio network node, e.g. base station, 110 or the wireless device 120.

(Action 1) Determine recurrent displacement vectors for the multi-antenna array.

(Action 2) Determine channel covariance matrix for the multi-antenna array based on channel estimates.

(Action 3) Calculate phase corrections using covariance matrix entries corresponding to recurrent displacement vectors.

(Action 4) Calibrate multi-antenna array by applying phase corrections.

As should be realized, embodiments herein may be applied for calibration regarding transmission (Tx cases) and/or reception (Rx cases) of radio signals by the multi-antenna array.

Which node(s) that perform which action and more how actions can be performed in further detail, differ between some embodiments, e.g. between some Rx and Tx cases, and will be discussed further below with support from drawings.

Figure 6:
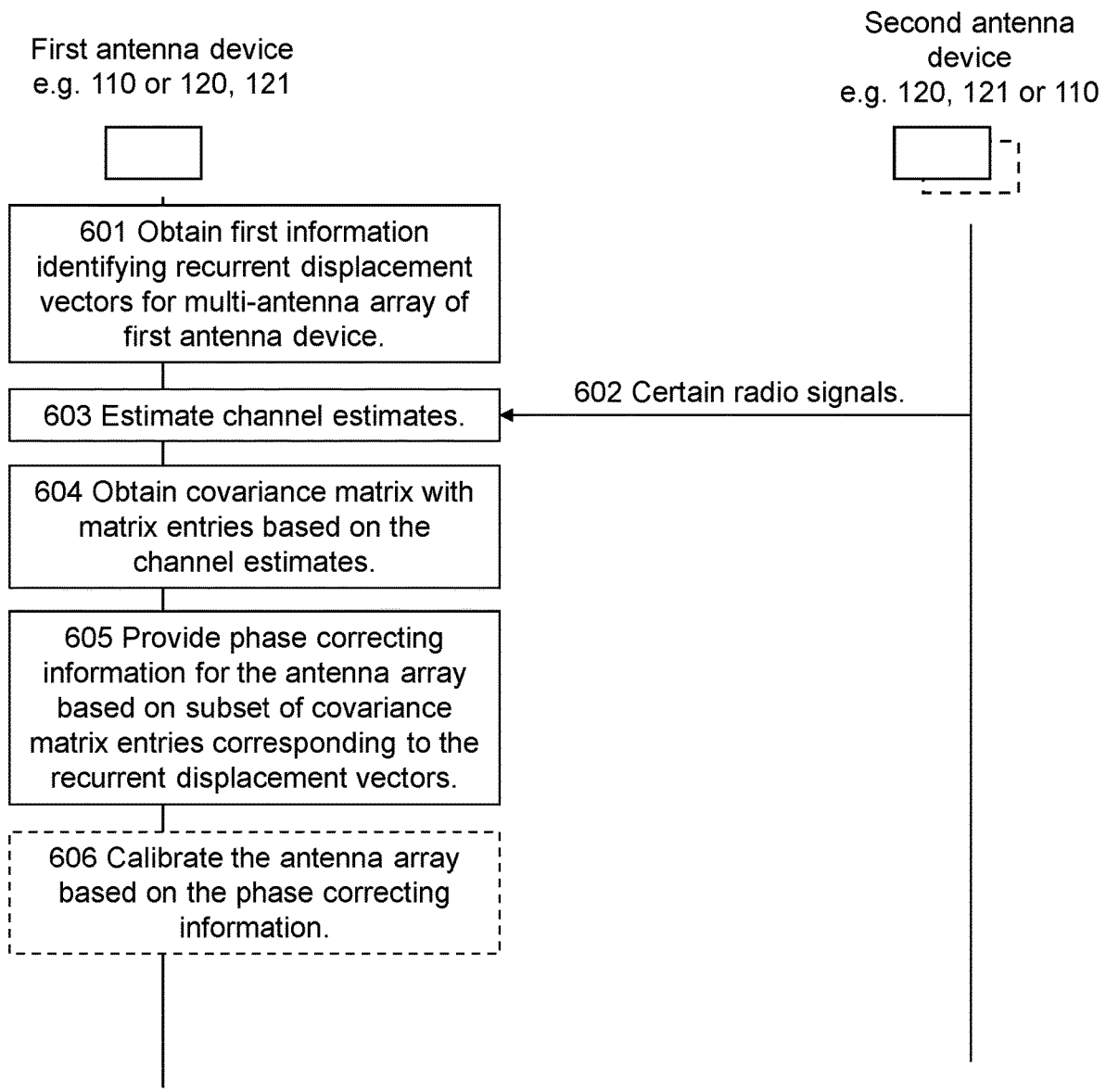
FIG. 6 is a first combined signalling diagram and flowchart for describing and discussing some examples and embodiments.

FIG. 6 is a first combined signalling diagram and flowchart for describing and discussing some examples and embodiments herein relating to a method for supporting calibration of a first antenna device, e.g. corresponding to 110 or 120, comprising a multi-antenna array, e.g. 250 or 350. The multi-antenna array may thus be an ULA or UPA, but as should be realized, embodiments herein can be applied to any multi-antenna array with recurring displacement vectors. These embodiments relate to Rx cases, i.e. when the antenna array is to be calibrated for reception of signals.

For example, if the first antenna device with the multi-antenna array is the radio network node 110, the calibration relate to uplink transmission to the radio network node 110, i.e. to reception of signals transmitted by wireless devices, e.g. the wireless devices 120-121, and received by the radio network node 110. If the first antenna device instead is e.g. the wireless device 120, calibration relates to downlink transmission to the wireless device 120, i.e. to reception of signals transmitted by the radio network node 110 and received by the wireless device 120.

It is further assumed for these embodiments that actions are mainly performed by the first antenna device and to some extent by the second antenna device, which may not be the case for all embodiments herein, as discussed further below.

The actions below may be taken in any suitable order and/or be carried out fully or partly overlapping in time when this is possible and suitable.

Action 601

The first antenna device obtains first information identifying recurrent displacement vectors for the multi-antenna array. This action may thus correspond to action 1 above. The present action may comprise determining said recurrent displacement vectors. Since the recurrent displacement vectors are given by the geometry of the multi-antenna array, this information may be predetermined and available to the first antenna device, or it can be determined from predetermined information about the antenna geometry if such is available to and/or accessible by the first antenna device.

Action 602

The first antenna device, and more specifically the multi-antenna array, receives certain radio signals that channel estimates are to be estimated from. These are transmitted by one or more second antenna devices, e.g. wireless devices 120, 121 if the first antenna device is the radio network node 110, or the radio network node 110 if the first antenna device is e.g. the wireless device 120.

Said certain radio signals may correspond to predefined reference signals of the wireless communication network 100, e.g. that are regularly transmitted by wireless devices, if e.g. the radio network node 110 is the first antenna device, or by the radio network node, if e.g. the wireless device 120 is the first antenna device. The reference signals may be such already available for other reason in the wireless communication network 100 or may be dedicated signal only for calibration purposes. In some embodiments the certain signals may even be data transmission signals. An advantage with embodiments herein is compatibility with many different radio signals for the channel estimation.

Some examples of already existing signals that can be suitable to use and relevant for LTE or NR, e.g. when the wireless communication network 100 is a LTE network or NR network, i.e. 3GPP 4G or 5G network, are Sounding Reference Signals (SRS), DeModulation Reference Signals (DMRS) on Physical Uplink Shared CHannel (PUSCH), Random Access CHannel (RACH) preambles, Physical Uplink Control Channel (PUCCH) signals, PUSCH signals, etc.

Action 603

The first antenna device estimates the channel estimates, corresponding to above, from the received certain radio signals. As should be realized, this typically involves that the first antenna device measures said certain radio signals as received by each antenna element of the multi-antenna array. A channel estimate may be based on multiple signal measurements. Estimation is thus on radio signals received by the multi-antenna array of the first antenna after transmission by a second antenna device, e.g. the first wireless device 120, if the first antenna device is the radio network node 110, or the radio network node, if the first antenna device is the wireless device 120. The transmission is over radio propagation channels, e.g. 125. As should be realized, each radio propagation channel is between the second antenna device and an antenna element of the multi-antenna array.

Which certain radio signals to estimate from and/or from which second antenna device(s) they are transmitted may be selected by the first antenna device. The selection may involve sending one or more messages, similar as discussed below, to some second antenna devices, requiring them to transmit said certain radio signals, or to select second antenna device(s) based on strength or quality of received signals.

Action 604

The first antenna device obtains a channel covariance matrix, e.g. corresponding to $\hat{R}$ above, for the multi-antenna array based on the channel estimates. More particularly, the first antenna device here obtains the channel covariance matrix by determining it, e.g. computing the channel covariance matrix $\hat{R}$ from $\hat{h}$. The channel covariance matrix thus comprises covariance matrix entries based on the channel estimates.

This action may thus correspond to action 2 above.

Action 605

The first antenna device provides phase correcting information to be used in calibration of the multi-antenna array. This action may thus correspond to action 3 above. The phase correcting information is typically provided, as explained above, by computing it based on the channel covariance matrix $\hat{R}$, that in turn is based on the channel estimates h, and knowledge about the recurring displacement vectors from the obtained first information. More specifically, the phase correcting information is based on a subset of covariance matrix entries of the channel covariance matrix, which subset corresponds to the recurrent displacement vectors, as explained above. The computations may e.g. be in accordance with any one of the above exemplifying algorithms, suitable for the multi-antenna array in questions, or similar algorithm for estimating phase errors or a compensation vector, e.g. by estimating X, such that $X\hat{R}X^H$ gets the expected structure according to the recurring displacement vectors, or equivalently estimating the decalibration phases C.

Phase correcting information may here be any information that can be used to, or that comprises information that can be used to, correct or reduce phase errors in signals received by the multi-antenna array. For example, the phase correcting information may correspond the diagonal matrix X used in examples herein, its inverse, or entries thereof, or correspond to identification of some configuration that operates on received signals by the multi-antenna array for correction of the phase errors.

Action 606

The first antenna device may then thus calibrate the multi-antenna array based on the phase correcting information, i.e. using or applying the phase correcting information. This may involve configuring the first antenna device so that the phase correcting information will be applied to signals received by the multi-antenna array for a certain period and/or until further notice. The calibration may here be for received signal in general by the multi-antenna array or only signals associated with the calibration, e.g. signal from wireless devices in a certain area, and/or in a certain direction, or signals from the second antenna device, e.g. radio network node or wireless devices(s), that provided said certain radio signals that channels estimates were estimated from.

Rx antenna array calibration as above may e.g. be useful in the case that DFT-based beam space transformations and reductions are used for channel estimation and subsequent data demodulation.

Figure 7:
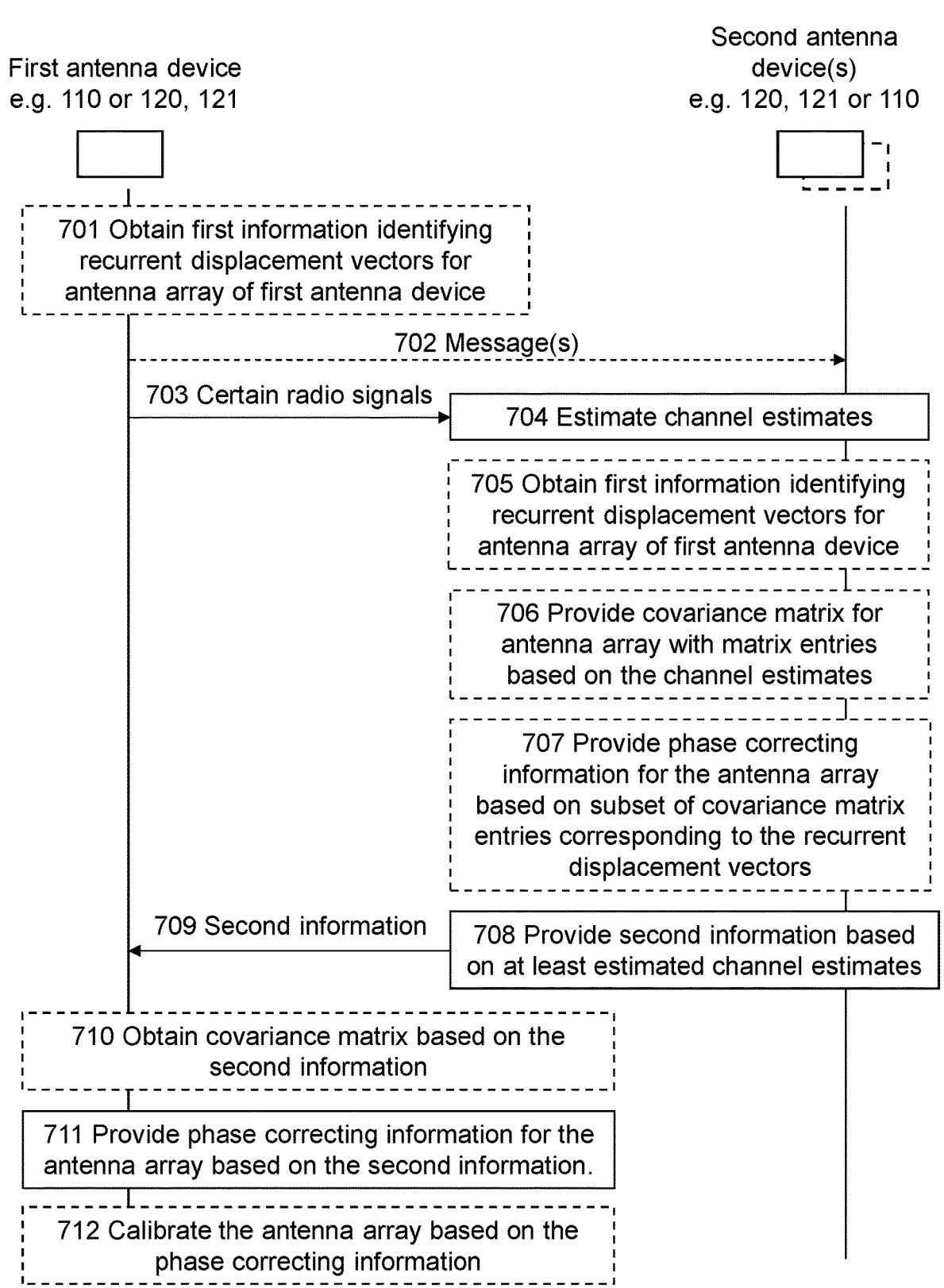
FIG. 7 is a second combined signalling diagram and flowchart for describing and discussing some examples and embodiments.

FIG. 7 is a second combined signalling diagram and flowchart for describing and discussing some examples and embodiments herein relating to another method for supporting calibration of a first antenna device, e.g. corresponding to 110 or 120, comprising a multi-antenna array, e.g. 250 or 350. The multi-antenna array may thus be an ULA or UPA, but as should be realized embodiments herein in principle can be applied to any multi-antenna array with recurring displacement vectors.

These embodiments relate to Tx cases instead of Rx cases as for FIG. 6, i.e. now when the antenna array is to be calibrated for transmission of signals. It is realized that Tx cases can be a bit more complicated since some feedback is required from one or more second antenna devices, although the basic principles are the same.

Here, for example, if the first antenna device with the multi-antenna array is the radio network node 110, the calibration relate to downlink transmission to wireless devices, e.g. 120-121, i.e. to transmission of signals by the radio network node 110 for reception by wireless devices. If the first antenna device instead is e.g. the wireless device 120, calibration relates to uplink transmission to the radio network node 110, i.e. to transmissions of signals by the wireless device 120 to the radio network node 110.

It is further assumed for these embodiments that actions are mainly performed by the first antenna device and second antenna device(s), which may not be the case for all embodiments, e.g. as discussed further below.

The actions below may be taken in any suitable order and/or be carried out fully or partly overlapping in time when this is possible and suitable.

Action 701

In some of these embodiment, the first antenna device obtains first information identifying recurrent displacement vectors for the multi-antenna array. This action may be the same as for Action 601 above.

Action 702

The first antenna device may transmit one or more messages to second antenna devices, e.g. to wireless devices 120, 121 if the first antenna device is the radio network node 110, or to the radio network node 110 if the first antenna device is e.g. the wireless device 120.

In some of these embodiments, one or more of the messages request said second antenna device(s) to estimate channel estimates from certain radio signals transmitted by the first antenna device and/or provide second information back based on at least the channel estimates. The one or more second antenna devices, e.g. wireless devices or radio network node, such as base station, that the messages(s) are sent to, and that thereby may be selected to provide the second information, may be selected based on being associated with or having a channel quality exceeding a certain, e.g. predetermined, threshold. Additionally or alternatively a round robin method may be used to select some or all of available second antenna devices.

The messages(s) may also comprise information identifying said certain radio signals, e.g. to enable said second antenna device(s) to obtain said channel estimates from them. In some embodiments, said certain radio signals to be used for obtaining the channel estimates are predetermined and already known by the second antenna device(s).

Moreover, in some embodiments, one or more of the message(s) comprise information regarding the multi-antenna array such that said one or more second devices become enabled to: determine the channel covariance matrix with said covariance matrix entries, and/or provide covariance matrix entries at least corresponding to a subset of covariance matrix entries corresponding to the recurrent displacement vectors, and/or provide phase correcting information as discussed above in connection with FIG. 6. In other words, the message(s) may contain information so that the second antenna device(s) may perform similar actions as described above for the first antenna device, e.g. as in Actions 601, 604 and/or 605. This enable a lesser amount of second information for feedback to the first antenna device compared to if e.g. the channel estimates as such are transmitted back.

The information regarding the multi-antenna array may e.g. comprise information on its structure, such as number of and how the antenna elements are arranged in relation to each other, and/or information on the channel covariance matrix, and/or the first information identifying recurrent displacement vectors as obtained in Action 701.

The information regarding the multi-antenna array may further comprise information regarding which of said certain radio signals are transmitted by which of the antenna elements. If this is not predetermined or predefined and known by the second antenna device(s), this information typically has to be provided to the second antenna device to enable provision of the channel estimates.

Action 703

The first antenna device, and more specifically the multi-antenna array, transmits certain radio signals that channel estimates are to be estimated from. The second antenna device(s) receive these signals after transmission over radio propagation channels.

Similar as above for the embodiments relating to FIG. 6, said certain radio signals may correspond to predefined reference signals of the wireless communication network 100, e.g. that are regularly transmitted by wireless devices or by radio network nodes. The reference signals may be such already available for other reason in the wireless communication network 100 or may be dedicated signal only for calibration purposes. See e.g. Action 603 above for further information and examples of said certain radio signals.

Action 704

The second antenna device(s) estimates the channel estimates, corresponding to h above, from the received certain radio signals. As should be realized, this typically involves that each second antenna device measures said certain radio signals as transmitted from each antenna element of the multi-antenna array and received by the second antenna device per propagation channel in Action 703. A channel estimate may be based on multiple signal measurements. Estimation is thus on radio signals transmitted by the multi-antenna array of the first antenna after receipt by a second antenna device, e.g. the wireless device 120 if the first antenna device is the radio network node 110, or the radio network node 110 if the first antenna device is the wireless device 120. The transmission is thus over radio propagation channels and as already indicated, each propagation channel is between an antenna element of the multi-antenna array and the second antenna device.

Action 705

In some embodiments, the second antenna device(s) obtains corresponding first information as in Action 701, i.e. identifying recurrent displacement vectors for the multi-antenna array. In some embodiment, as indicated above, the first information is obtained by being received from the first antenna device, e.g. in said one or more messages as described above under Action 702, but may alternatively be obtained by e.g. computation from other information regarding the multi-antenna array structure, e.g. received in said one or more messages, for example computed from information on the multi-antenna array structure, such as number of and how the antenna elements are arranged in relation to each other.

The present action may be performed when the second antenna device is to perform an action corresponding to Action 605, i.e. provide phase correction information, since the information on the recurrent displacement vectors are then used, and/or provide only some covariance matrix entries corresponding to the recurrent displacement vectors for transmission to the first antenna device, see e.g. under Action 707 below. This enable a lesser amount of information for feedback to the first antenna device compared to if e.g. the channel estimates as such are transmitted back, as also indicated above under Action 702.

Action 706

In some embodiments, the second antenna device(s) provide a channel covariance matrix for the multi-antenna array based on the channel estimates. The second antenna device(s) may provide the channel covariance matrix by determining it, e.g. computing the channel covariance matrix $\hat{R}$ from the channel estimates h. The channel covariance matrix comprises covariance matrix entries based on the channel estimates. This action may be instead of Action 709 below.

Action 707

In some embodiments, the second antenna device(s) provides phase correcting information to be used in calibration of the multi-antenna array, i.e. provide phase correcting information similar as in Action 605 above. The phase correcting information is thus typically provided by computing it based on the provided channel covariance matrix in Action 706 and the first information obtained in Action 705. As explained above under Action 605, the phase correcting information is based on a subset of covariance matrix entries of the channel covariance matrix, which subset corresponds to the recurrent displacement vectors, as explained above.

In some embodiments, the phase correcting information identifies precoders, e.g. from a codebook, and that can be applied by the first antenna device to signals before transmission by the multi-antenna array, thereby correcting and reducing the phase errors. This typically enable provision of a very small amount of second information, see next actions, for transmission to the first antenna device.

Action 708

The second antenna device(s) provides second information based on at least the estimated channel estimates.

In some embodiments, the second information comprises said channel estimates. For these embodiments, the second antenna device(s) is typically not performing Actions 705-706. However, as already indicated above, a drawback is then that transmission of the second information when it contains the channel estimates, see Action 709 below, may be a larger amount of second information than desirable to transmit.

In some embodiments, the second information comprises the covariance matrix provided in Action 706, or covariance matrix entries of said channel covariance matrix at least corresponding to said subset. At least the latter is typically a much lesser amount of information than the channel estimates, thereby enabling transmission of a less amount of second information in the next action.

In some embodiments, the second information comprises at least part of phase correcting information provided in Action 707. This may enable transmission of an even lesser amount of second information in the next action.

Action 709

The second information is transmitted to and received by the first antenna device, i.e. there is feedback to the first antenna device of information based on at least the channel estimates estimated by the second antenna deice(s), i.e., channel estimates regarding said certain radio signals that were transmitted by the multi-antenna array of the first antenna device in Action 703.

Action 710

In some embodiments, the first antenna device obtains the channel covariance matrix for the multi-antenna array based on the second information.

This action may e.g. be performed when the second information received in action 709 comprised the channel estimates and thus when Action 706 was not performed by the second antenna device(s). More particularly, the first antenna device then obtains the channel covariance matrix by determining it, e.g. computing the channel covariance matrix $\hat{R}$ from $\hat{h}$.

Also, this action may e.g. be performed when the second information received in Action 709 comprises the channel covariance matrix and thus when Action 706 was performed by the second antenna device(s). More particularly, the first antenna device then obtains the channel covariance matrix by receiving it for the second antenna device(s).

Further, this action may e.g. be performed when the second information received in Action 709 comprises covariance matrix entries of said channel covariance matrix, at least corresponding to the said subset, and thus when Action 706 was performed by the second antenna device(s). More particularly, the first antenna device obtaining the channel covariance matrix then at least partly involves receiving the covariance matrix entries corresponding to said subset.

The present action may thus correspond to Action 604 but for the Tx calibration case and based on channel estimates estimated by the second antenna device(s).

Action 711

The first antenna device provides, based on the second information, phase correcting information to be used in calibration of the multi-antenna array. This action may correspond to Action 605 above but where at least part of information used for the provision, e.g. used in computations of the phase correcting information, have been received in the second information.

The phase correcting information may thus be provided by being computed based on the channel covariance matrix provided in Action 710 and/or or based on the second received in Action 709 if the second information comprised the covariance matrix provided in Action 706 and/or comprised the covariance matrix entries of said channel covariance matrix at least corresponding to said subset.

In some embodiments, when the second information comprises at least part of phase correcting information provided in Action 707, the phase correcting information provided in the present action may fully or partly correspond to the phase correcting information received in the second information.

Action 712

The first antenna device may then calibrate the multi-antenna array based on the phase correcting information, i.e. using or applying the phase correcting information. This action may correspond to Action 606 but with regard to transmitted rather than received signals. That is, the present action may involve configuring the first antenna device so that the phase correcting information will be applied to signals transmitted by the multi-antenna array for a certain period and/or until further notice. The calibration may be for transmitted signal in general by the multi-antenna array or only signals associated with the calibration, e.g. signals to wireless devices in a certain area, and/or in a certain direction, or signals to the second antenna device, e.g. radio network node or wireless devices(s), that received said certain radio signals that channels estimates were estimated from.

Embodiments herein may be performed repeatedly, at least partly, e.g. involving Actions 602-606 or Action 702-704, 706-712, so that calibration can be re-performed to improve and/or better suit new situations and circumstance that may affect phase errors, e.g. when phase errors in C are time-varying, e.g. due to temperature drift or similar. In case of a "static" multi-antenna array, which typically is the case, Actions 601, 701, 705 are typically the same although channel estimates may change between occasions for application of embodiments herein. However, at least parts of embodiments herein, such as Actions 602-606 or Action 702-704, 706-712 may be performed regularly, e.g. at pre-defined intervals, or intermittently, e.g. based on some triggering mechanism and/or trigger signal thar trigger re-performance of e.g. Actions 602-606. A trigger may e.g. be based on a certain temperature change, or other environmental changes that are known to, or likely may, affect phase error, and/or be based on one or more KPIs regarding radio link quality.

In some embodiments herein, the calibration is used to accomplish coherent or improved coherent beamforming. Further, as already indicated, the phase correcting information may be provided and calibration be made based on certain radio signals from multiple second antenna devices, e.g. multiple wireless devices such as 120, 121. In such situation, channel estimates may first be obtained from second antenna device(s) with e.g. low rate transmissions and/or that are in better radio conditions, then, when calibration based on these channel estimates have been performed and coherent beamforming, or improved coherent beamforming, has been accomplished, this may enable to obtain new and channel estimates also from second antenna devices with high rate transmissions and/or that are in poorer radio conditions. By re-performing embodiments like this even further improved calibration and coherent beamforming can be accomplished.

When the antenna array is a UPA, embodiments herein may be applied separately for horizontal and vertical extensions of the multi-antenna array. Other embodiments herein may be applied jointly for both vertically and horizontally separated elements.

In some embodiments, the multi-antenna array is a general array but with at least one recurring displacement vector. The provision of phase correcting information and calibration discussed above, may then only concern, e.g. relate only, to phase correcting information associated with said at least one recurring displacement vector.

It may be noted that calibration in embodiments herein, e.g. in Actions 606 and 712 above, may involve application of the provided phase correcting information to transmitted or received signals. If e.g. s is a signal vector, i.e. subject for calibration, then a calibrated instance of this vector may be y=Xs, where X may correspond to the inverse of the estimated diagonal matrix with the phase errors, C, and may correspond to the phase correcting information. In some embodiment, the phase correcting information is instead precoders, e.g. selected from a predetermined codebook, that are determined, e.g. selected, based on C. It may be further noted that this can be done on baseband signals or on RF signals, e.g. depending on what is suitable, e.g. due to implementational aspects.

Moreover, embodiments herein may be used to trigger another, e.g. a prior art antenna calibration method or mechanism, such as based on any one indicated in the Background. For example, if embodiments herein are not sufficient for desirable calibration, e.g. due too few samples or noisy samples, they may still be used to trigger calibration using the prior art antenna calibration method that may not suffer from the same problems and calibration can still be applied. For example, residual linear phase errors, e.g., in the case of a ULA or more generally the residual phase errors in the case of arbitrary arrays, may be calibrated using e.g. a prior art method as described in the Background section.

In some embodiments, a residual linear phase error, which may considered related to a beam pointing error, is determined from a measurement where the direction to the other end of the involved radio link is known. In other embodiments, provided covariance matrices for channels to or from multiple devices, e.g. second antenna devices, are analyzed to get a distribution of direction estimates. The residual linear phase error may then be determined from a comparison of this distribution of directions with an expected distribution. E.g., for a 120° sector covering multi-antenna array, e.g. of the radio network node 110, with uniform traffic distribution in the sector, it would be expected that the directions are symmetrically distributed around the so called boresight of the array. A residual linear phase error would shift the distribution towards positive or negative azimuth angles, which means that the mean azimuth angle can be used to determine the residual linear phase shift. The same principle can be applied also for other cases with a priori knowledge about the direction distribution.

In some embodiments, also amplitude errors, in addition to phase errors, are calibrated. The amplitude errors may e.g. be determined from the diagonal elements of the covariance matrix The phase errors may be substantially constant over the frequency band for which the multi-antenna array is being used or configured to be used, or there may be frequency-dependent phase errors, such as in the case of wideband or multiband communication. Embodiments herein may be used to determine a single phase coefficients per antenna element, e.g. corresponding to the provided phase correcting information, or to determine multiple, frequency-dependent, phase coefficients per antenna element, each corresponding to the provided phase correcting information. In the latter case, embodiments herein, or relevant actions thereof, may be performed, or applied independently, to each of multiple frequency bands of the involved wideband or multiband of frequencies. An alternative to this may be to identify or find a delay shift In for each antenna element and which is common for all frequencies, and where the frequency-dependent phase shift on relate to the delay shift according to $2\pi f\tau_n = \varphi_n$.

In some embodiments, already indicated above, only a subset of the elements in the covariance matrix $\hat{R}$ is provided and/or or received, namely those that correspond to the elements that will be used for determining or computing C, or X. For example, for embodiments where only the first sub-diagonal of $\hat{R}$ is used, this reduces the needed number of elements from $N^2$, in case of a full covariance matrix, to N−1, which can substantially reduce memory need for storage and/or amount of information for feedback, e.g. in the form of the second information discussed herein.

Figure 8:
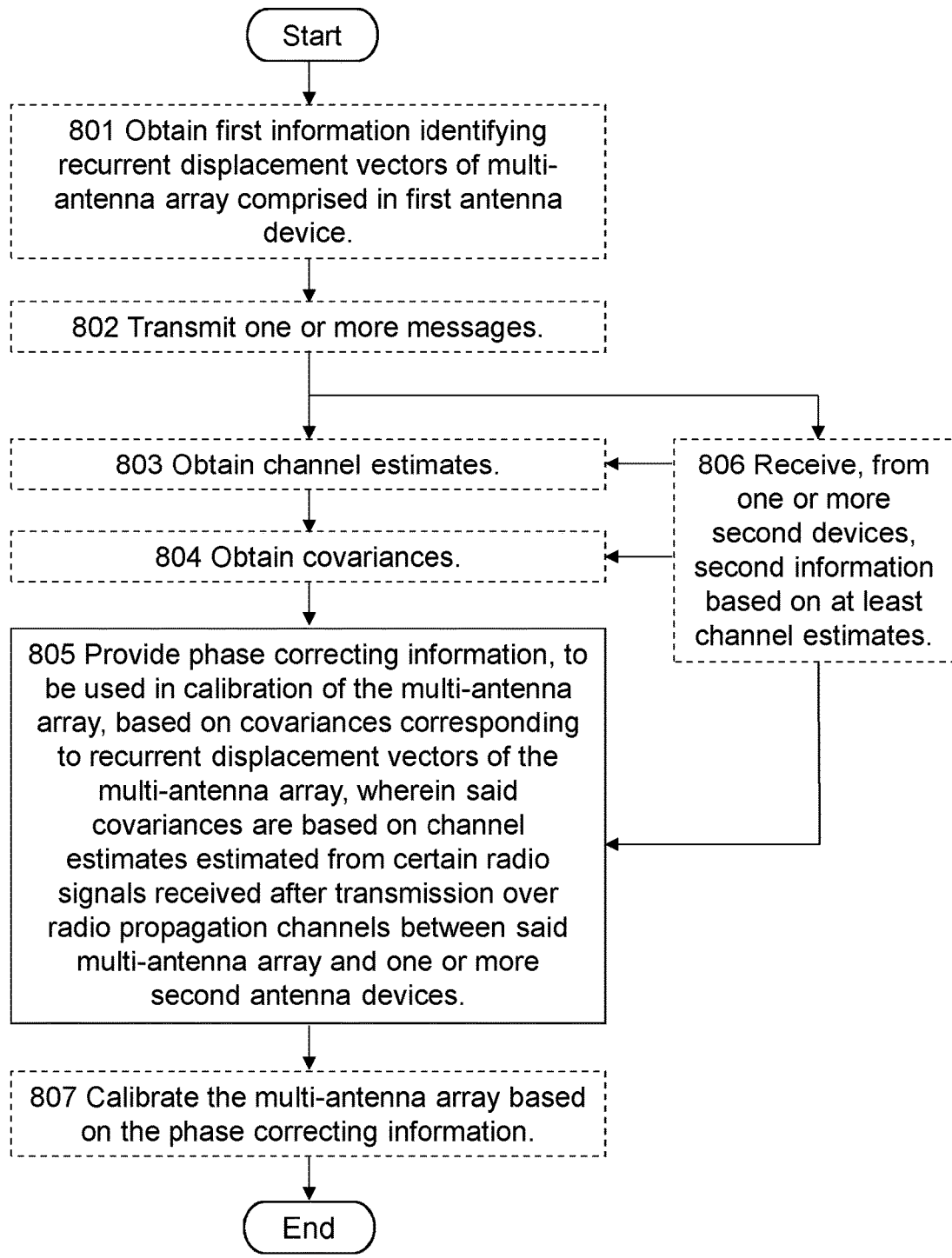
FIG. 8 is a flowchart schematically illustrating embodiments of a method according to embodiments herein.

FIG. 8 is a flowchart schematically illustrating embodiments of a method according to embodiments herein. The method is for supporting calibration of a multi-antenna array, e.g. 250 or 350, comprised in a first antenna device. Said multi-antenna array may thus be an ULA or UPA, or any multi-antenna array with recurring displacement vectors, as described above. The first antenna device is typically operative with a wireless communication network, e.g. 100.

In some embodiments, the first antenna device corresponds to a radio network node, e.g. 110, comprised in the wireless communication network. In other embodiments, the first antenna device corresponds to a wireless device, e.g. 120, configured to be served by the wireless communication network.

The method may be performed by one or more first devices that may correspond to or comprise the first antenna device, and in some embodiments, relating to calibration regarding transmitted signals, said one or more first devices may correspond to or comprise the second antenna device. Said one or more first devices may correspond to or comprise the radio network node 110 or wireless device 120. The first device(s) may correspond to or be comprised in the wireless communication network 100 and/or may correspond to or comprise the further network 200 and/or or further node 201. The method, e.g. actions thereof, may fully or partly be provided as a cloud service, accessible by e.g. the first antenna device.

The actions below may be taken in any suitable order and/or be carried out fully or partly overlapping in time when this is possible and suitable.

Action 801

The first device(s) may obtain first information identifying recurrent displacement vectors, e.g. 352, of the multi-antenna array.

This action may fully or partly correspond Actions 601, 701, 705.

Action 802

The first device(s) may transmit one or more messages to one or more second antenna devices. Said second antenna devices(s) should be the same second antenna devices as involved in Action 803 below.

In some embodiments, relating to calibration regarding received signals, at least some of said one or more messages request said second device(s) to transmit certain radio signals. Said certain radio signals may then be received by the first antenna device in response to the transmission of the one or more messages. Said certain radio signals should be the same as in Action 803 below.

In some embodiments, relating to calibration regarding transmitted signals, at least some of said one or more messages request said one or more second devices to provide second information based on at least said channel estimates. Said second information is then received by the first antenna device in response to the transmission of said at least some of the one or more messages. Said certain radio signals should be the same as in Action 803 below and said second information should as for Action 806 below.

In some embodiments, relating to calibration regarding transmitted signals, at least some of said one or more messages comprises information identifying said certain radio signals and/or identifying which signals thereof are transmitted by which antenna element of the multi-antenna array. Thereby, said second antenna device(s) may be enabled or supported to estimate channel estimates that then e.g. may be obtained by the first device(s) in Action 803 below.

In some embodiments, relating to calibration regarding transmitted signals, at least some of said one or more messages comprises information regarding the multi-antenna array, e.g. 250 or 350, which information supports said second device(s), e.g. information such that said second antenna device(s) become enabled, to determine covariances, e.g. a channel covariance matrix with covariance matrix entries and/or provide covariance matrix entries at least corresponding to a subset of all entries of the channel covariance matrix, and/or to provide phase correcting information. The covariances, or channel covariance matrix, entries thereof and said subset, should be as for Action 805 below. The information regarding the multi-antenna array may e.g. comprise information on its structure, e.g. number of and how the antenna elements are arranged, and/or information on the channel covariance matrix, and/or the first information identifying recurrent displacement vectors.

This makes, as explained above, it possible for the second antenna device to transmit, e.g. feedback, a lesser amount of second information, see e.g. Action 806, compared to if the second information comprises channel estimates. The second antenna device may use the information in said messages(s) and the channel estimates to provide second information that corresponds to, or more directly can be used to provide, the phase correcting information. For example, with many antenna elements of the antenna array and many propagation channels, the channel estimates as such may correspond to a large amount of information that that would require substantial bandwidth to transmit, while e.g. covariance matrix entries corresponding to the recurrent displacement vectors, as explained elsewhere herein, may be a lesser amount of information. The information amount may even be further reduced if the second antenna device directly provides phase correcting information. As mentioned, the phase correcting information may e.g. be terms of the diagonal matrix, e.g. C or X, or phase errors thereof, or may be in the form of precoders, all of which can be represented by a smaller amount of data and thereby enabling a lesser amount of second information for transmission to the first device(s), e.g. the first antenna device. A "cost" for this is that computations, or processing, is needed to be performed by the second devices(s), e.g. by each second antenna device, to accomplish said lesser amount of second information.

The present action may fully or partly correspond to Action 702.

Action 803

The first device(s) may obtain channel estimates estimated from certain radio signals received after transmission over radio propagation channels, e.g. 125, between said multi-antenna array of the first antenna device and one or more second antenna devices operative with the wireless communication network, e.g. 100.

When the first antenna device corresponds a radio network node, e.g. 110, comprised in the wireless communication network, e.g. 100, the second antenna device(s) may comprise or correspond to one or more wireless devices, e.g. 120, 121, configured to be served by the wireless communication network and the radio network node.

When the first antenna device corresponds to a wireless device, e.g. 120, configured to be served by the wireless communication network, e.g. 100, the second device(s) may comprise or correspond to a radio network node, e.g. 110, comprised in the wireless communication network and configured to serve the wireless communication device 120.

In some embodiments, relating to calibration regarding received signals, said certain radio signals are transmitted by said second antenna device(s) and received by the first antenna device. Said channel estimates are in these embodiments based on measurements by the first antenna device on said received certain radio signals. When the first antenna device is comprised in the first device(s), the channel estimates may thus in the present action be obtained by being provided, such as estimated, by the first antenna device. If the first antenna device is separate from the first device(s), the first device(s) may obtain the channel estimates by receiving them from the second antenna device(s), e.g. as part of second information as in Action 806 below.

In some embodiments, relating to calibration regarding transmitted signals, said certain radio signals are transmitted by said first antenna device and received by said second antenna devices. Said channel estimates are in these embodiments based on measurements by said one or more second antenna devices on said received certain radio signals. The first device(s) may in the present action thus obtain the channel estimates by receiving them from the second antenna device(s), e.g. as part of second information as in Action 806 below.

In some embodiments, said certain radio signals correspond to predefined reference signals of the wireless communication network, e.g. 100, and/or to data transmission signals, to or from, one or more wireless communication devices, e.g. 120, 121, being served by the wireless communication network. An advantage with embodiments herein is that already existing signals, that are mainly used for other purposes, can be utilized when embodiments herein are implemented in a wireless communication network. This facilitates implementation of embodiments herein in existing wireless communication networks and reduces overhead.

The present action may fully or partly correspond to Actions 602-604, 703-704.

Action 804

The first device(s) may obtain covariances, e.g. a channel covariance matrix with and/or covariance matrix entries of such matrix, based on said obtained channel estimates, e.g. as obtained in Action 803. The covariances, e.g. corresponding to said matrix entries, shall at least comprise matrix entries that correspond to recurrent displacement vectors, e.g. 352, of the multi-antenna array, e.g. as identified by the obtained first information in Action 801.

In some embodiments, the covariances are obtained by being provided, such as determined, e.g. computed, by the first device(s) itself, based on the channel estimates. In some embodiments, the covariances, at least corresponding to said recurrent displacement vectors, are obtained by being received from the second antenna device, e.g. comprised in the second information as in Action 806 below.

The present action may fully or partly correspond to Actions 604, 709, 710.

Action 805

The first device(s) provides phase correcting information, to be used in calibration of the multi-antenna array. The phase correcting information is based on covariances corresponding to recurrent displacement vectors, e.g. 352, of the multi-antenna array, e.g. as identified by the obtained first information in Action 801. In some embodiments, said covariances correspond to a subset of covariance matrix entries of a channel covariance matrix for the multi-antenna array, which subset correspond to said recurrent displacement vector. The covariances, the covariance matrix and/or said subset of entries may have been obtained in Action 804.

The covariances, e.g. corresponding to covariance matrix entries, are thus based on channel estimates, such as obtained in Action 803. Hence, the channel estimates are estimated from certain radio signals, e.g. corresponding said certain radio signals discussed above, received after transmission over the radio propagation channels, e.g. 125, between the multi-antenna array and one or more second antenna devices operative with the wireless communication network 100. The one or more second antenna devices may be as described above.

The covariance matrix with entries based on the channel estimates, e.g. $\hat{h}$, may correspond to $\hat{R}$ used in other examples herein.

In some embodiments, the phase correcting information is provided by being computed based on said subset of covariance matric entries of the covariance matrix, e.g. of $\hat{R}$. In some embodiments, the provided phase correcting information is at least partly received from the second antenna device, e.g. comprised in the second information as in Action 806 below.

The provision of the phase correcting information may be based on computation of terms, e.g. elements of a diagonal matrix, e.g. C or X, according to a predetermined algorithm that operates on said covariances, e.g. on covariances corresponding to covariance matrix entries of said subset. Said diagonal matrix may relate to said channel estimates, e.g. $\hat{h}$, according to:

$$\hat{h}=Ch+s,$$

where h corresponds to the actual radio propagation channels being estimated and s corresponds to noise and estimation errors. Said terms, e.g. elements of the diagonal matrix, will thus contain information on phase errors introduced then said certain radio signals propagate through said radio propagation channels. As should be realized, C and $\hat{h}$ here, i.e. in the present method, may correspond to C and $\hat{h}$ used in the examples above. Said predetermined algorithm may e.g. be any one of those algorithms shown above and/or other that can be developed for computation of said terms, e.g. elements of C or X, and be used in implementation of embodiments herein.

As already indicated above, phase correcting information as used herein may be any information that can be used to, or that comprises information that can be used to, correct or reduce phase errors when the multi-antenna array is used to transmit or receive radio signals to/from devices corresponding to the second antenna devices. For example, the phase correcting information may correspond terms or elements of the diagonal matrix, e.g. C used in examples herein, its inverse X, or entries thereof, or correspond to information identifying precoders that will correct said phase errors when applied.

As explained above, embodiments are based on realization of some mathematical and technical relations and how the recurrent displacement vectors with corresponding reduced amount of covariance matrix entries based on channel estimates can be utilized to find out about the phase errors and thereby information for correction of the phase errors, i.e. the phase correcting information that thus can be used for calibration regarding the phase errors. Advantages compared to prior art solutions have been mentioned above and include for example that embodiments herein enable less complex and less costly calibration methods. Conventional calibration methods, e.g. regarding residual errors, may still be applied but to fewer phases, which may facilitate implementation and reduce costs as well. Embodiments herein may further be implemented using standardized codebooks, e.g. GoB based codebooks as in LTE and NR, providing performance benefits. Also embodiments can utilize reference signals that are typically already present in a wireless communication network, reducing overhead and facilitating implementation in and compatibility with existing wireless communication networks. In other words, to sum up, embodiments herein provide improvements regarding calibration of a multi-antenna array, such as for use in transmission and/or reception of radio signals in wireless communication network.

The present action may fully or partly correspond to Actions 605, 708, 711.

Action 806

The first device may receive, from said one or more second devices, second information based on at least said channel estimates. This is typically the case for embodiments relating to calibration regarding transmitted signals. In these embodiments the phase corrections are then provided based on said received second information, as already indicated above under Actions 803-805. Hence:

In some embodiments, said received second information comprises the channel estimates, and the channel estimates in e.g. Action 803 may thus be obtained by being received in the second information.

In some embodiments, said received second information instead comprises the covariances at least corresponding to said recurrent displacement vectors, e.g. covariance matrix entries of said channel covariance matrix at least corresponding to said subset, and the covariances, e.g. channel covariance matrix entries, such as obtained in Action 804, may be based on the received second information.

In some embodiments, said received second information comprises at least part of said phase correcting information.

Note that, as indicted above, see e.g. Action 802, the second information may be transmitted by the second antenna device(s), and thus be received in the present action, in response to that the second antenna devices(s) received said one or more messages from the first device(s), requesting the second information to be transmitted.

The present action may fully or partly correspond to Action 709.

Action 807

The first device(s) may calibrate the multi-antenna array based on the provided phase correcting information. The calibration thus involves applying the phase correcting information. When embodiments herein relate to a Tx calibration case, this may e.g. correspond to configuring the first antenna device so that signals, before being transmitted by the first antenna device, will be multiplied with terms corresponding to the inverse of said diagonal matrix, e.g. C. When embodiments herein relate to a Rx calibration case this may e.g. correspond to that signals received by the first antenna device will be multiplied with terms corresponding to the inverse of the diagonal matrix C.

The present action may fully or partly correspond to Actions 606, 712.

In some embodiment of the method above, each of said covariances, e.g. covariance matrix entries of the channel covariance matrix, is based on a combination of channel estimates relating to that covariance, e.g. entry, wherein channel estimates of the combination pertain to different estimation occasions, and/or to channel estimation relating to different second antenna devices, e.g. 120, 121. The combination of channel estimates relating to different second antenna devices may be based on weighting the channel estimates so that second antenna devices experiencing better signal to noise ratio or associated with less angular spread in the channel are given a higher weighting. Alternatively there may be equal weighting to all second antenna devices. Further, same weighting may be applied both for Rx and Tx channel estimates.

Figure 9:
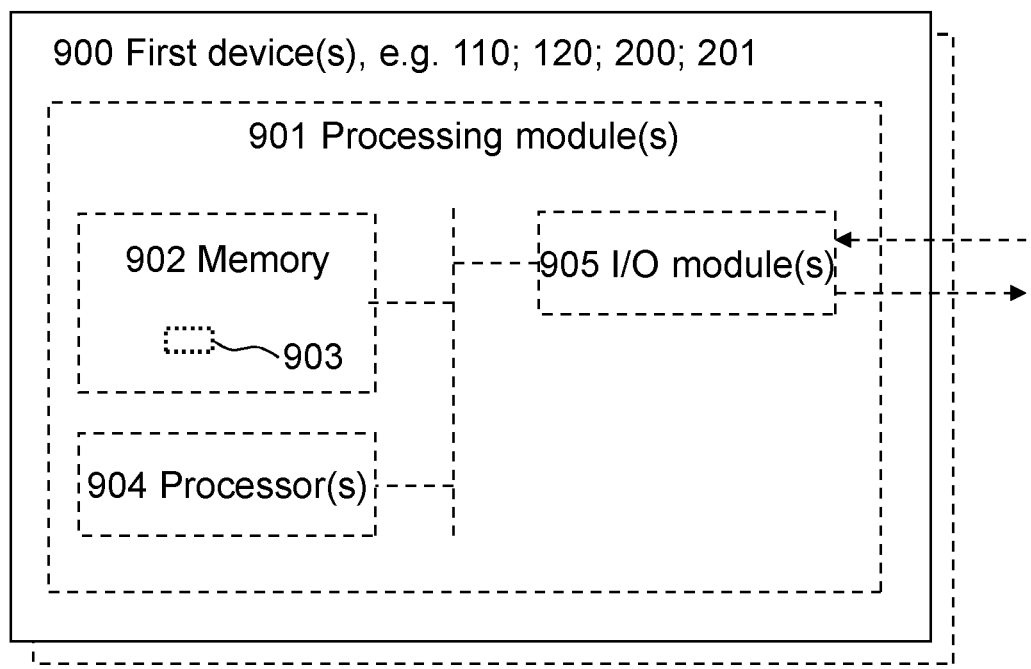
FIG. 9 is a schematic block diagram for illustrating embodiments of how one or more first devices may be configured to perform the method and actions discussed above in connection with FIG. 8.

FIG. 9 is a schematic block diagram for illustrating embodiments of how one or more first devices 900, e.g. said one or more first devices discussed above in connection with FIG. 8, may be configured to perform the method and actions discussed above in connection with FIG. 8.

Hence, the first device(s) 900, e.g. any one of 110; 120; 200; 201, is for supporting calibration of a multi-antenna array, e.g. 250 or 350, comprised in a first antenna device, e.g. 110 or 120, configured to be operative with a wireless communication network, e.g. 100.

The first device(s) 900 may comprise processing module(s) 901, such as a means, one or more hardware modules, including e.g. one or more processors, and/or one or more software modules for performing said method and/or actions.

The first device(s) 900 may further comprise memory 902 that may comprise, such as contain or store, computer program(s) 903. The computer program(s) 903 comprises 'instructions' or 'code' directly or indirectly executable by the first device(s) 900 to perform said method and/or actions. The memory 902 may comprise one or more memory units and may further be arranged to store data, such as configurations and/or applications involved in or for performing functions and actions of embodiments herein.

Moreover, the first device(s) 900 may comprise processor(s) 904, i.e. one or more processors, as exemplifying hardware module(s) and may comprise or correspond to one or more processing circuits. In some embodiments, the processing module(s) 901 may comprise, e.g. 'be embodied in the form of' or 'realized by' processor(s) 904. In these embodiments, the memory 902 may comprise the computer program 903 executable by the processor(s) 904, whereby the first device(s) 900 is operative, or configured, to perform said method and/or actions thereof.

Typically the first device(s) 900, e.g. the processing module(s) 901, comprises Input/Output (I/O) module(s) 905, configured to be involved in, e.g. by performing, any communication to and/or from other units and/or devices, such as sending and/or receiving information to and/or from other devices, e.g. transmitting to and/or receiving from the second antenna device and/or first antenna device. The I/O module(s) 905 may be exemplified by obtaining, e.g. receiving, module(s) and/or providing, e.g. sending, module(s), when applicable.

Further, in some embodiments, the first device(s) 900, e.g. the processing module(s) 901, comprises one or more of an providing module(s), calibrating module(s), obtaining module(s), transmitting module(s), receiving module(s), as exemplifying hardware and/or software module(s) for carrying out actions of embodiments herein. These modules may be fully or partly implemented by the processor(s) 904. Hence:

The first device(s) 900, and/or the processing module(s) 901, and/or the processor(s) 904, and/or the I/O module(s) 905, and/or the providing module(s) should thus be operative, or configured, to provide said phase correcting information.

The first device(s) 900, and/or the processing module(s) 901, and/or the processor(s) 904, and/or the I/O module(s) 905, and/or the calibrating module(s) may also be operative, or configured, to calibrate the multi-antenna array based on the provided phase correcting information.

The first device(s) 900, and/or the processing module(s) 901, and/or the processor(s) 904, and/or the I/O module(s) 905, and/or the obtaining module(s) may be operative, or configured, to: obtain said first information, and/or obtain said channel estimates, and/or obtain said channel covariance matrix.

The first device(s) 900, and/or the processing module(s) 901, and/or the processor(s) 904, and/or the I/O module(s)

905, and/or the receiving module(s) may be operative, or configured, to receive said second information.

The first device(s) 900, and/or the processing module(s) 901, and/or the processor(s) 904, and/or the I/O module(s) 905, and/or the transmitting module(s) may be operative, or configured, to transmit said one or more messages.

Figure 10:
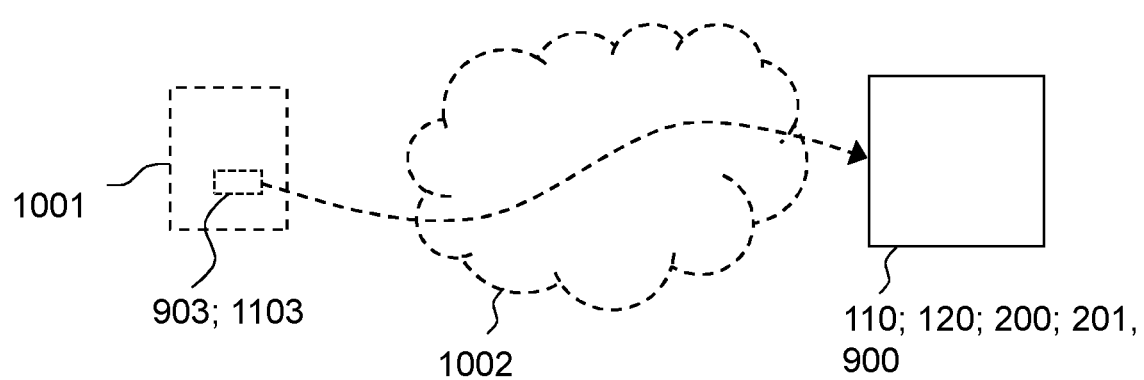
FIG. 10 is a schematic drawing illustrating some embodiments relating to computer program and carriers thereof to cause device(s) to perform said method and related actions.

FIG. 10 is a schematic drawing illustrating some embodiments relating to computer program(s) and carriers thereof to cause said first device(s) 900 discussed above to perform said first method and related actions. The computer program(s) may be the computer program(s) 903 and comprises instructions that when executed by the processor(s) 904 and/or the processing module(s) 901, cause the first device(s) 900 to perform as described above. In some embodiments there is provided carrier(s), or more specifically data carrier(s), e.g. computer program product(s), comprising the computer program(s). Each carrier may be one of an electronic signal, an optical signal, a radio signal, and a computer readable storage medium, e.g. a computer readable storage medium or media 1001 as schematically illustrated in the figure. The computer program(s) 903 may thus be stored on such computer readable storage medium 1001. By carrier may be excluded a transitory, propagating signal and the data carrier may correspondingly be named non-transitory data carrier. Non-limiting examples of the data carrier(s) being computer readable storage medium or media is a memory card or a memory stick, a disc storage medium such as a CD or DVD, or a mass storage device that typically is based on hard drive(s) or Solid State Drive(s) (SSD). The computer readable storage medium or media 1001 may be used for storing data accessible over a computer network 1002, e.g. the Internet or a Local Area Network (LAN). The computer program(s) 903 may furthermore be provided as pure computer program(s) or comprised in a file or files. The file or files may be stored on the computer readable storage medium or media 1001 and e.g. available through download e.g. over the computer network 1002 as indicated in the figure, e.g. via a server. The file or files may e.g. be executable files for direct or indirect download to and execution on said first device(s) 900 to make it perform as described above, e.g. by execution by the processor(s) 904. The file or files may also or alternatively be for intermediate download and compilation involving the same or another processor(s) to make them executable before further download and execution causing said first device(s) 900 to perform as described above.

Note that any processing module(s) and circuit(s) mentioned in the foregoing may be implemented as a software and/or hardware module, e.g. in existing hardware and/or as an Application Specific Integrated Circuit (ASIC), a field-programmable gate array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analogue and digital circuits, and/or one or more processors configured with software and/or firmware, e.g. stored in memory, that, when executed by the one or more processors may make the node(s) and device(s) to be configured to and/or to perform the above-described methods and actions.

Identification by any identifier herein may be implicit or explicit. The identification may be unique in a certain context, e.g. in the wireless communication network or at least in a relevant part or area thereof.

The term "network node" or simply "node" as used herein may as such refer to any type of node that may communicate with another node in and be comprised in a communication network, e.g. IP network or wireless communication network. Further, such node may be or be comprised in a radio network node (described below) or any network node, which e.g. may communicate with a radio network node. Examples of such network nodes include any radio network node, a core network node, Operations & Maintenance (O&M), Operations Support Systems (OSS), Self Organizing Network (SON) node, etc.

The term "radio network node" as may be used herein may as such refer to any type of network node for serving a wireless communication device, e.g. a so called User Equipment or UE, and/or that are connected to other network node(s) or network element(s) or any radio node from which a wireless communication device receives signals from. Examples of radio network nodes are Node B, Base Station (BS), Multi-Standard Radio (MSR) node such as MSR BS, eNB, eNodeB, gNB, network controller, RNC, Base Station Controller (BSC), relay, donor node controlling relay, Base Transceiver Station (BTS), Access Point (AP), New Radio (NR) node, transmission point, transmission node, node in distributed antenna system (DAS) etc.

Each of the terms "wireless communication device", "wireless device", "user equipment" and "UE", as may be used herein, may as such refer to any type of wireless device arranged to communicate with a radio network node in a wireless, cellular and/or mobile communication system. Examples include: target devices, device to device UE, device for Machine Type of Communication (MTC), machine type UE or UE capable of machine to machine (M2M) communication, Personal Digital Assistant (PDA), tablet, mobile, terminals, smart phone, Laptop Embedded Equipment (LEE), Laptop Mounted Equipment (LME), Universal Serial Bus (USB) dongles etc.

While some terms are used frequently herein for convenience, or in the context of examples involving other a certain, e.g. 3GPP or other standard related, nomenclature, it must be appreciated that such term as such is non-limiting Also note that although terminology used herein may be particularly associated with and/or exemplified by certain communication systems or networks, this should as such not be seen as limiting the scope of the embodiments herein to only such certain systems or networks etc.

As used herein, the term "memory" may refer to a data memory for storing digital information, typically a hard disk, a magnetic storage, medium, a portable computer diskette or disc, flash memory, random access memory (RAM) or the like. Furthermore, the memory may be an internal register memory of a processor.

Also note that any enumerating terminology such as first device or node, second device or node, first base station, second base station, etc., should as such be considered non-limiting and the terminology as such does not imply a certain hierarchical relation. Without any explicit information in the contrary, naming by enumeration should be considered merely a way of accomplishing different names.

As used herein, the expression "configured to" may e.g. mean that a processing circuit is configured to, or adapted to, by means of software or hardware configuration, perform one or more of the actions described herein.

As used herein, the terms "number" or "value" may refer to any kind of digit, such as binary, real, imaginary or rational number or the like. Moreover, "number" or "value"

may be one or more characters, such as a letter or a string of letters. Also, "number" or "value" may be represented by a bit string.

As used herein, the expression "may" and "in some embodiments" has typically been used to indicate that the features described may be combined with any other embodiment disclosed herein.

In the drawings, features that may be present in only some embodiments are typically drawn using dotted or dashed lines.

As used herein, the expression "transmit" and "send" are typically interchangeable. These expressions may include transmission by broadcasting, uni-casting, group-casting and the like. In this context, a transmission by broadcasting may be received and decoded by any authorized device within range. In case of unicasting, one specifically addressed device may receive and encode the transmission. In case of group-casting, e.g. multicasting, a group of specifically addressed devices may receive and decode the transmission.

When using the word "comprise" or "comprising" it shall be interpreted as nonlimiting, i.e. meaning "consist at least of".

The embodiments herein are not limited to the above described preferred embodiments. Various alternatives, modifications and equivalents may be used. Therefore, the above embodiments should not be taken as limiting the scope of the present disclosure, which is defined by the appending claims.

The invention claimed is:

1. A method, performed by one or more first devices, for supporting calibration of a multi-antenna array comprised in a first antenna device operative with a wireless communication network, wherein the method comprises:
   providing phase correcting information, to be used in calibration of the multi-antenna array, based on covariances corresponding to recurrent displacement vectors of the multi-antenna array and wherein said covariances are based on channel estimates estimated from certain radio signals received after transmission over radio propagation channels between said multi-antenna array of the first antenna device and one or more second antenna devices operative with the wireless communication network.

2. A device for supporting calibration of a multi-antenna array, the device comprising a first antenna, wherein the multi-antenna array is comprised within the first antenna, wherein the device is configured to be operative with a wireless communication network, wherein the device is configured to:
   provide phase correcting information, to be used in calibration of the multi-antenna array, based on covariances corresponding to recurrent displacement vectors of the multi-antenna array and wherein said covariances are based on channel estimates estimated from certain radio signals received after transmission over radio propagation channels between said multi-antenna array of the first antenna and one or more second antennas operative with the wireless communication network.

3. The device as claimed in claim 2, wherein the provision of the phase correcting information is based on computation of elements of a diagonal matrix, "C", according to a predetermined algorithm that operates on said covariances, wherein said diagonal matrix, "C", relates to said channel estimates, "ĥ", according to:

$$\hat{h}=Ch+s,$$

where "h" corresponds to the actual radio propagation channels being estimated and "s" corresponds to noise and estimation errors.

4. The device as claimed in claim 2, wherein the device is further configured to:
   calibrate the multi-antenna array based on the provided phase correcting information.

5. The device as claimed in claim 2, wherein the first antenna corresponds to a radio network node comprised in the wireless communication network and said one or more second antennas correspond to one or more wireless communication devices configured to be served by the wireless communication network and the radio network node.

6. The device as claimed in claim 2, wherein the first antenna corresponds to a wireless communication device configured to be served by the wireless communication network and said one or more second antennas correspond to a radio network node comprised in the wireless communication network and configured to serve the wireless communication device.

7. The device as claimed in claim 2, wherein said certain radio signals correspond to predefined reference signals of the wireless communication network, and/or to data transmission signals, to or from, one or more wireless communication devices being served by the wireless communication network.

8. The device as claimed in claim 2, wherein the device is further configured to:
   obtain first information identifying said recurrent displacement vectors of the multi-antenna array;
   obtain said channel estimates, and
   obtain said covariances with said covariance matrix entries at least corresponding to said subset and based on said obtained channel estimates.

9. The device as claimed in claim 2, wherein said certain radio signals are transmitted by said one or more second antennas and received by the first antenna, wherein said channel estimates are based on measurements by the first antenna on said received certain radio signals.

10. The device as claimed in claim 2, wherein said certain radio signals are transmitted by said first antenna and received by one or more of said second antennas, wherein said channel estimates are based on measurements by said one or more second antennas on said received certain radio signals, wherein the device is further configured to:
    receive, from one or more second devices, second information based on at least said channel estimates,
    and wherein said phase corrections are provided based on said received second information.

11. The device as claimed in claim 10, wherein the device is further configured to:
    transmit, to said one or more second antennas, one or more messages, at least some requesting said one or more second devices to provide said second information,
    and wherein said second information is received in response to transmission of said one or more messages.

12. The device as claimed in claim 11, wherein said one or more messages comprises information identifying said certain radio signals and/or identifying which signals thereof are transmitted by which antenna element of the multi-antenna array.

13. The device as claimed in claim 10, wherein said received second information comprises said channel estimates.

14. The device as claimed in claim 10, wherein said received second information comprises covariances at least corresponding to said recurrent displacement vectors.

15. The device as claimed in claim 10, wherein said received second information comprises at least part of said phase correcting information.

16. The device as claimed in claim 10, wherein the device is further configured to:
  transmit, to said one or more second devices, one or more messages comprising information regarding the multi-antenna array for supporting said one or more second devices to determine said covariances, and/or to provide said phase correcting information.

17. The device as claimed claim 2, wherein each of said covariances is based on a combination of channel estimates relating to that covariance, wherein channel estimates of the combination pertain to different estimation occasions, and/or to channel estimation relating to different second antennas.

18. The device as claimed in claim 17, wherein the combination of channel estimates relating to different second antennas is based on weighting the channel estimates so that second antennas experiencing better signal to noise ratio or associated with less angular spread in the channel are given a higher weighting.

19. A non-transitory computer-readable medium comprising instructions that when executed by one or more processors cause a device to:
  provide phase correcting information, to be used in calibration of a multi-antenna array comprised in a first antenna, based on covariances corresponding to recurrent displacement vectors of the multi-antenna array and wherein said covariances are based on channel estimates estimated from certain radio signals received after transmission over radio propagation channels between said multi-antenna array of the first antenna and one or more second antennas operative with the wireless communication network.

* * * * *